(12) United States Patent
Spears et al.

(10) Patent No.: US 9,199,747 B2
(45) Date of Patent: Dec. 1, 2015

(54) ICE CREAM SANDWICH APPARATUS

(71) Applicants: Scott Spears, Columbus, OH (US); Eric Rousculp, Worthington, OH (US); Jack Spencer, Westerville, OH (US)

(72) Inventors: Scott Spears, Columbus, OH (US); Eric Rousculp, Worthington, OH (US); Jack Spencer, Westerville, OH (US)

(73) Assignee: DARIFILL, INC., Westerville, OH (US)

( * ) Notice: Subject to any disclaimer, the term of this patent is extended or adjusted under 35 U.S.C. 154(b) by 316 days.

(21) Appl. No.: 13/679,683

(22) Filed: Nov. 16, 2012

(65) Prior Publication Data

US 2013/0067858 A1 Mar. 21, 2013

Related U.S. Application Data

(60) Continuation-in-part of application No. 12/969,201, filed on Dec. 15, 2010, now abandoned, which is a division of application No. 12/073,515, filed on Mar. 6, 2008, now Pat. No. 7,874,130.

(60) Provisional application No. 60/905,073, filed on Mar. 6, 2007.

(51) Int. Cl.
| | |
|---|---|
| A21C 9/04 | (2006.01) |
| B65B 3/10 | (2006.01) |
| A23G 7/00 | (2006.01) |
| B65B 25/00 | (2006.01) |
| B65B 41/16 | (2006.01) |
| A23G 9/28 | (2006.01) |
| B65B 11/54 | (2006.01) |

(52) U.S. Cl.
CPC ............... *B65B 3/10* (2013.01); *A23G 7/0043* (2013.01); *A23G 9/286* (2013.01); *B65B 11/54* (2013.01); *B65B 25/007* (2013.01); *B65B 41/16* (2013.01)

(58) Field of Classification Search
CPC .......... B65B 3/10; B65B 11/10; B65B 41/16; A23G 7/0043
USPC ........... 53/120, 220, 222, 230, 307, 446, 544; 99/372, 405.4, 450.7
See application file for complete search history.

(56) References Cited

U.S. PATENT DOCUMENTS

| | | |
|---|---|---|
| 2,639,677 A | 5/1953 | Anderson |
| 2,794,404 A | 6/1957 | Rapp |
| 2,875,708 A | 3/1959 | Hensgen |
| 2,993,453 A | 7/1961 | Fay |
| 3,119,353 A | 1/1964 | Roehn, Jr. |
| 3,316,860 A | 5/1967 | Peterson |
| 3,783,772 A | 1/1974 | Fay |
| 3,828,660 A | 8/1974 | Mueller et al. |
| 3,834,119 A | 9/1974 | Armitt et al. |
| 3,855,758 A | 12/1974 | Walter et al. |
| 4,078,362 A | 3/1978 | Ellis |
| 4,098,057 A | 7/1978 | Holcomb |
| 4,448,012 A | 5/1984 | Kauffman et al. |

(Continued)

OTHER PUBLICATIONS

The Lynch Ice Cream Sandwich Machine, Operation Manual and Parts List, Lynch Machinery, 2300 Crystal St., Anderson, Ind. (1940).

*Primary Examiner* — Thien S Tran
(74) *Attorney, Agent, or Firm* — Vorys, Sater, Seymour and Pease LLP; William H. Oldach, III; William L. Klima

(57) ABSTRACT

An ice cream sandwich apparatus for making and wrapping ice cream sandwiches. The ice cream sandwich apparatus includes a plurality of stations driven by servo motors.

18 Claims, 25 Drawing Sheets

(56) References Cited

U.S. PATENT DOCUMENTS

| | | | |
|---|---|---|---|
| 4,584,933 A | 4/1986 | Price | |
| 4,612,852 A | 9/1986 | Price et al. | |
| 4,628,664 A * | 12/1986 | Price | 53/232 |
| 4,846,388 A | 7/1989 | Benbow | |
| 5,493,957 A * | 2/1996 | Kennedy et al. | 99/450.4 |
| 2002/0000488 A1 | 1/2002 | Shepard et al. | |
| 2002/0037388 A1 * | 3/2002 | Morgante et al. | 428/89 |

* cited by examiner

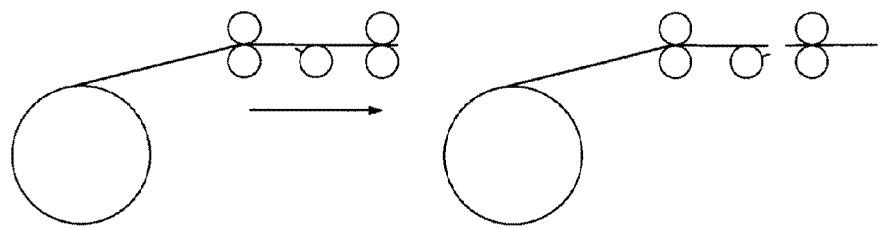
FIG. 10AFIG. 10B
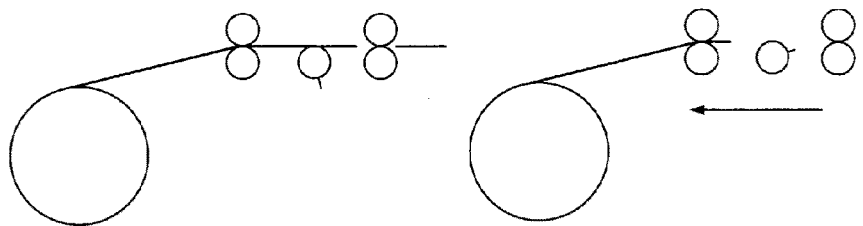
FIG. 10CFIG. 10D

ICE CREAM SANDWICH APPARATUS

RELATED APPLICATIONS

This application is a continuation-in-part of U.S. patent application Ser. No. 12/969,201 filed Dec. 15, 2010, which is a divisional application of U.S. patent application Ser. No. 12/073,515 filed on Mar. 6, 2008, now U.S. Pat. No. 7,874, 130, granted Jan. 25, 2011, which non-provisional applications are based upon Provisional Application No. 60/905,073 filed Mar. 6, 2007, priority to which is hereby claimed and which all applications are incorporated by reference herein.

FIELD

An ice cream sandwich apparatus for making ice cream sandwiches and/or wrapping ice cream sandwiches.

BACKGROUND

There have been many machines known in the prior art for the manufacture and wrapping of ice cream sandwiches, the basic features of which are well understood by those of ordinary skill in the art. Examples of such prior art devices include those disclosed in U.S. Pat. No. 3,828,660 to Mueller et al., U.S. Pat. No. 3,834,119 to Armitt et al., and U.S. Pat. No. 5,493,957 to Kennedy et al., which are incorporated herein by reference.

As shown in these patents and as is well known in the prior art, an ice-cream sandwich filling machine typically comprises a machine frame to which a series of stations are affixed. The moving components of the machine are typically controlled by a numerical or computer controller through one or more drive mechanisms. The first station is typically the wafer filling station, in which a top and bottom wafer are provided by wafer feeders and an ice-cream extruder discharges ice cream between the wafers. The completed sandwich is then delivered, often via an indexing wheel or similar device, to a conveyor, also affixed to the machine frame, which carries the sandwich toward a wrapping area.

When the sandwich arrives at the wrapping area, it first enters at the bottom of a vertical elevator, where a cut sheet of wrap paper, provided by primary and secondary paper rollers and cut by a rotary knife between the two rollers, is situated atop the sandwich. The paper rollers are typically biased downward through the use of mechanical compression springs to provide friction between the roller and the supplied paper and thus to prevent slippage. The operation of the paper rollers and rotary knife and the arrangement of the cut sheet atop the sandwich is known in the prior art, and typically all of these parts have been commonly driven. The elevator then carries the sandwich and cut sheet upwards through the wrapping assembly, where a pusher mechanism cooperates with side and bottom tucking devices both to fold the paper about the sandwich and to push the wrapped sandwich toward an exit tray. The operation of these tuckers is also known in the prior art. The exit tray in turn includes one or more heated platens, which act to heat seal the bottom overlaps of the cut sheet of wrapping paper to each other, providing a secure wrap.

Despite the periodic improvements reflected in the above-referenced patents, there remain several drawbacks inherent in prior art ice cream sandwich-making machines, particularly with respect to the wrapping of the finished ice-cream sandwich product. For example, in prior art machines, the wrapping station requires either a mechanism to hold the wrapped sandwich during the return stroke of the pusher, or the use of two separate cams to drive separate vertical and horizontal plates. This requires adjustments to the machine and can lead to damage to sandwiches where the hold-back mechanism is employed. In addition, the supply and cutting of the paper to wrap the sandwich in prior art machines suffers from several drawbacks, including the need for improved control of the supply roll through primary and secondary rollers, the need for a sensor to detect when the supply roll is nearly empty, and the need to be able to "park" the paper web to avoid damage to the paper when the machine is stopped. Finally, the exit trays commonly used in prior art machines are usually unbolted from the machine frame in order to gain access below the tray for cleaning operations. This operation is thus time-consuming, resulting in lost filling time. Also, unbolting and removing the exit tray exposes workers to potential harm should the tray, which usually weighs over forty pounds, be dropped.

Further, current ice cream sandwich making machines use a combination of AC motor and gearbox to drive the components of the machine through a series of belts, cams, gearboxes and shafts. This type of drive arrangement is subject to mechanical failure and continuous maintenance. Further, the components of this type of mechanical drive take up substantially more internal space within the machine, congest, interfere, and make difficult the maintenance, repair, and/or replacements of parts or components thereof. In addition, the relative motions and timing of components and stations are normally fixed in current machines, unless the machine is manually adjusted or an existing mechanical set up is changed out typically requiring substantial down time for the machine. Even further, many complex processes, for example motions, phasing and/or timing of components and stations are not achievable with this type of conventional drive arrangement due to limitations of mechanical factors.

SUMMARY

A first object is to provide an improved ice cream sandwich apparatus.

A second object is to provide an improved ice cream sandwich making and wrapping apparatus.

A third object is to provide an ice cream sandwich making and wrapping apparatus comprising or consisting of a first station for forming the ice cream sandwich, a second station for conveying the ice cream sandwich, and a third station for wrapping the ice cream sandwich.

A fourth object is to provide an ice cream sandwich making and wrapping apparatus comprising or consisting of a first station for forming the ice cream sandwich, a second station for conveying the ice cream sandwich, a third station for wrapping the ice cream sandwich, and a fourth station for feeding a wrapper sheet to the third station.

A fifth object is to provide an ice cream sandwich making and wrapping apparatus comprising or consisting of a first station for forming the ice cream sandwich, the first station comprising a star wheel and a star wheel servo motor for driving the star wheel, a second station for conveying the ice cream sandwich, the second station comprising a conveyor and a conveyor servo motor for driving the conveyor, and a third station for wrapping the ice cream sandwich, the third station comprising a wrapper head and a wrapper head servo motor for driving the wrapper head.

A sixth object is to provide an ice cream sandwich making and wrapping apparatus comprising or consisting of a first station for forming the ice cream sandwich, the first station comprising a star wheel and a star wheel servo motor for driving the star wheel, a second station for conveying the ice cream sandwich, the second station comprising a conveyor and a conveyor servo motor for driving the conveyor, a third station for wrapping the ice cream sandwich, the third station comprising a wrapper head and a wrapper head servo motor for driving the wrapper head, and a fourth station for supplying a sheet wrapper to the wrapper head for wrapping the ice cream sandwich, the fourth station comprising a sheet feeder and a sheet feeder servo motor from driving the sheet feeder.

A seventh object is to provide an ice cream sandwich making and wrapping apparatus comprising or consisting of a first station for forming the ice cream sandwich, the first station comprising a star wheel and a star wheel servo motor for driving the star wheel, a second station for conveying the ice cream sandwich, the second station comprising a conveyor and a conveyor servo motor for driving the conveyor, a third station for wrapping the ice cream sandwich, the third station comprising a wrapper head and a wrapper head servo motor for driving the wrapper head, and a controller for independently or dependently controlling the servo motors of the stations.

An eighth object is to provide an ice cream sandwich making and wrapping apparatus comprising or consisting of a first station for forming the ice cream sandwich, the first station comprising a star wheel and a star wheel servo motor for driving the star wheel, a second station for conveying the ice cream sandwich, the second station comprising a conveyor and a conveyor servo motor for driving the conveyor, a third station for wrapping the ice cream sandwich, the third station comprising a wrapper head and a wrapper head servo motor for driving the wrapper head, a fourth station for supplying a sheet wrapper to the wrapper head for wrapping the ice cream sandwich, the fourth station comprising a sheet feeder and a sheet feeder servo motor from driving the sheet feeder, and a controller for independently or dependently controlling the servo motors of the stations.

A ninth object is to provide an ice cream sandwich making and wrapping apparatus comprising or consisting of multiple stations each comprising one or more servo motors for driving one or more components of each station.

A tenth object is to provide an ice cream sandwich making and wrapping apparatus comprising or consisting of multiple stations each comprising one or more servo motors for driving one or more components of each station, and a controller connected to the servo motors and controlling the operation of the servo motors.

An eleventh object is to provide an ice cream sandwich making and wrapping apparatus comprising or consisting of multiple stations each comprising one or more servo motors for driving one or more components of each station, and a controller connected to the servo motors and controlling the operation of the servo motors and configured to coordinate the operation of at least two of the multiple stations.

A twelfth object is to provide an ice cream sandwich making and wrapping apparatus comprising or consisting of multiple stations each comprising one or more servo motors for driving one or more components of each station, and a controller connected to the servo motors and controlling the operation of the servo motors and configured to coordinate the operation of at least two successive multiple stations.

A thirteenth object is to provide an ice cream sandwich making and wrapping apparatus comprising or consisting of multiple stations each comprising one or more servo motors for driving one or more components of each station, and a controller connected to the servo motors and controlling the operation of the servo motors and configured to run at least one component of at least one of the multiple stations at a rate of operation higher or lower than a rate of operation of at least one component of the other multiple stations.

A fourteenth object is to provide an ice cream sandwich making and wrapping apparatus comprising or consisting of multiple stations each comprising one or more servo motors for driving one or more components of each station, and a controller connected to the servo motors and controlling the operation of the servo motors and configured to run at least one of the multiple stations at a rate of operation higher or lower than a rate of operation of at least one of the other multiple stations.

A fifteenth object is to provide an ice cream sandwich-making apparatus comprising or consisting of an improved pusher apparatus to deliver ice cream sandwiches from the wrapper head onto a heated platen while completing both bottom folds of the sandwich wrapping paper. The pusher apparatus comprises a horizontal plate and a vertical plate mounted to an oscillating arm driven by a cam. The vertical plate is attached rigidly to the oscillating arm, and the horizontal plate is spring loaded by an air cylinder so that it may move independently of the vertical plate.

A sixteenth object is to provide an ice cream sandwich-making apparatus comprising or consisting of primary and secondary paper rollers driven separately from the main drive and from the rotary knife to improve performance.

A seventeenth object is to provide an ice cream sandwich-making apparatus comprising or consisting of air cylinder springs configured to bias rollers to provide greater stability and adjustability to the pressure to be applied to paper rollers.

An eighteenth object is to provide an ice cream sandwich-making apparatus comprising or consisting of a sensor mechanism provided inside a machine frame to detect when the paper supply is running low.

A nineteenth object is to provide a method of operation of the paper rollers in an ice cream sandwich-making apparatus, comprising reversing the primary roller slightly after a sheet of paper is cut, thus avoiding damage to the paper web.

A twentieth object is to provide an ice cream sandwich-making apparatus comprising or consisting of a hinged exit tray providing easier access to a mechanism located below the tray for cleaning, while avoiding down time and possible injury.

The ice cream sandwich apparatus comprises a plurality of servo motor drives (i.e. servo drives) for driving components, parts, and/or stations of the ice cream sandwich apparatus. The servo drives may be coordinated by precision control to provide a variety of custom and/or complex effects. Increasing the number of servo motors and the manner of application and operation thereof, provides for an increased level of control of the movement and/or motion of components, parts and/or stations of the ice cream sandwich apparatus. Further, the servo drive can be arranged and operated in a manner to provide complex movement and coordination between components, parts, and stations (e.g. coordination between adjacent or contiguous stations or separated or discrete stations or no stations or all stations at anytime in any manner) of the ice cream sandwich apparatus.

For example, servo drives are provided on each axis (e.g. nine (9) axes) of the ice cream sandwich apparatus to provide high production rate performance. This arrangement allows for optimizing the motion on all the axes of the ice cream sandwich apparatus. Further, this arrangement allows the timing (phasing) between the motions to be optimized for each size ice cream sandwich (recipe driven) and by production rate (a function of machine speed).

The wafer is a critical part of the ice cream sandwich making process. The wafer is used to shear the ice cream from the extrusion nozzle. Further, the wafer is subject to a variety of forces (e.g. compression, tension, and shear) and pressures (forces/area) during and throughout the handling, loading, filling, assembly, conveying, and wrapping steps. As the machine speed is increased, the forces (pressures) on the wafer increase and the degree or level of breakage of the wafer increases. The limiting factor to production rate is generally wafer breakage.

The ice cream sandwich apparatus is less complex and congested allowing easier access for repair or replacement of components, parts, and/or stations. The timing and coordination of the various axes can be performed rapidly, through an electronic interface as compared to mechanically positioning cams, linkages, and timing belts.

The individual servo drives allow each axes motion to be optimized without adding complexity to the design. Again, the individual servo drives also allow relative timing (phasing) between the motions to be optimized for each size sandwich and by production rate.

Specifically, regarding the stripper, the servo motion can be optimized to move relatively faster upward (returning to the starting position), and then downward (the "working" motion where the wafer is moved into the star wheel pocket). This allows the wafer to be moved with the effective speed of a lower production rate. This reduces wafer breakage.

Further, regarding the star wheel, the current machine uses a 120 degree indexer (the motion is 120 degrees of 360 degrees, one-third of the time). The ice cream sandwich apparatus can provide a longer time of motion (e.g. 160 degrees). This longer time reduces the speed at which the star wheel must move for a given production rate. Again, the reduced speed (and therefore acceleration) reduces the force applied to the wafer, which leads to less wafer breakage.

Regarding the sheet feeder, the paper feed mechanism positions cut sheets of wrap above the sandwich as it is entering the wrapper head. As with all the motions on the filler, the synchronization is critical. The paper feed must also through the paper out with sufficient velocity for the paper's inertia to carry the paper to the proper position. The servo drives of the ice cream sandwich apparatus allow the secondary roller speed (relative to the primary roller) to be customized for various cut length and wrap materials. This leads a higher level of consistent sheet placement, and higher quality wrapping.

Regarding the elevator, the motion can be completely customized and optimized, leading to higher speeds and reduced breakage.

Regarding the pusher, the servo motor can reduce the stroke by operating and then braking the stroke.

Regarding the tuckers, the servo drive allows the stroke (i.e. distance moved) to be customized for various size sandwiches. This improves wrap quality.

The ice cream sandwich apparatus can provide variable star wheel indexing. This allows making the index period a function of production rate in order to optimize the filler at slow as well as fast production rates.

Further, the ice cream sandwich apparatus can quickly accommodate a change out of the star wheel (e.g. 12 pockets to 16 pockets to run various size ice cream sandwiches). The maximum size sandwich is limited by the maximum pocket size. The servo drive will allow for larger pockets.

In addition, the ice cream sandwich apparatus allows for preventing the tri-fingers require being change out for various sized ice cream sandwiches. The amount of change out of parts can be reduced or eliminated for various sized ice cream sandwiches by changing the timing (phasing) of the transfer conveyor based on sandwich size.

BRIEF DESCRIPTION OF THE DRAWINGS

FIG. 10A is a diagrammatic view illustrating a method for parking wrap paper.

FIG. 10B is a diagrammatic view illustrating a method for parking wrap paper.

FIG. 10C is a diagrammatic view illustrating a method for parking wrap paper.

FIG. 10D is a diagrammatic view illustrating a method for parking wrap paper.

DETAILED DESCRIPTION

Improved Pusher Apparatus

Figure 1:
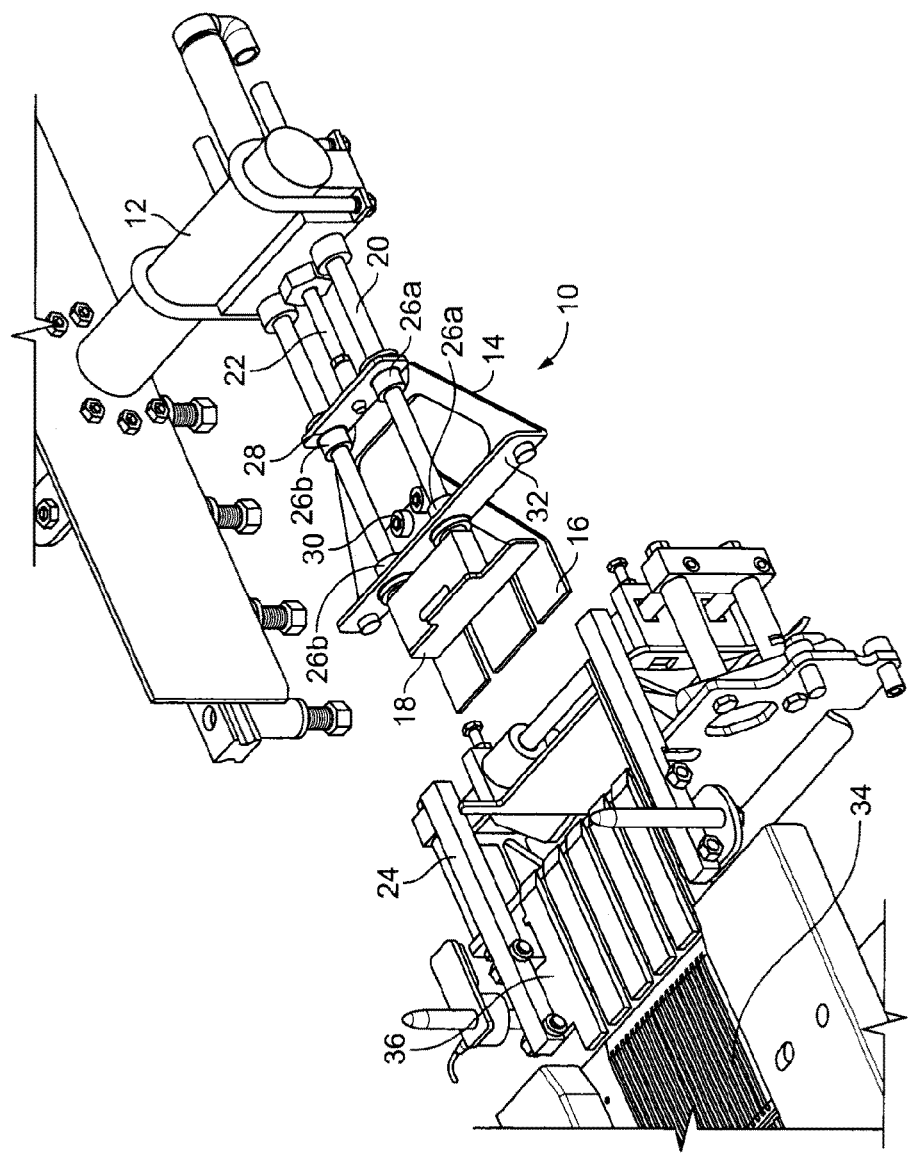
FIG. 1 is a perspective view of an improved pusher apparatus.
Figure 2:
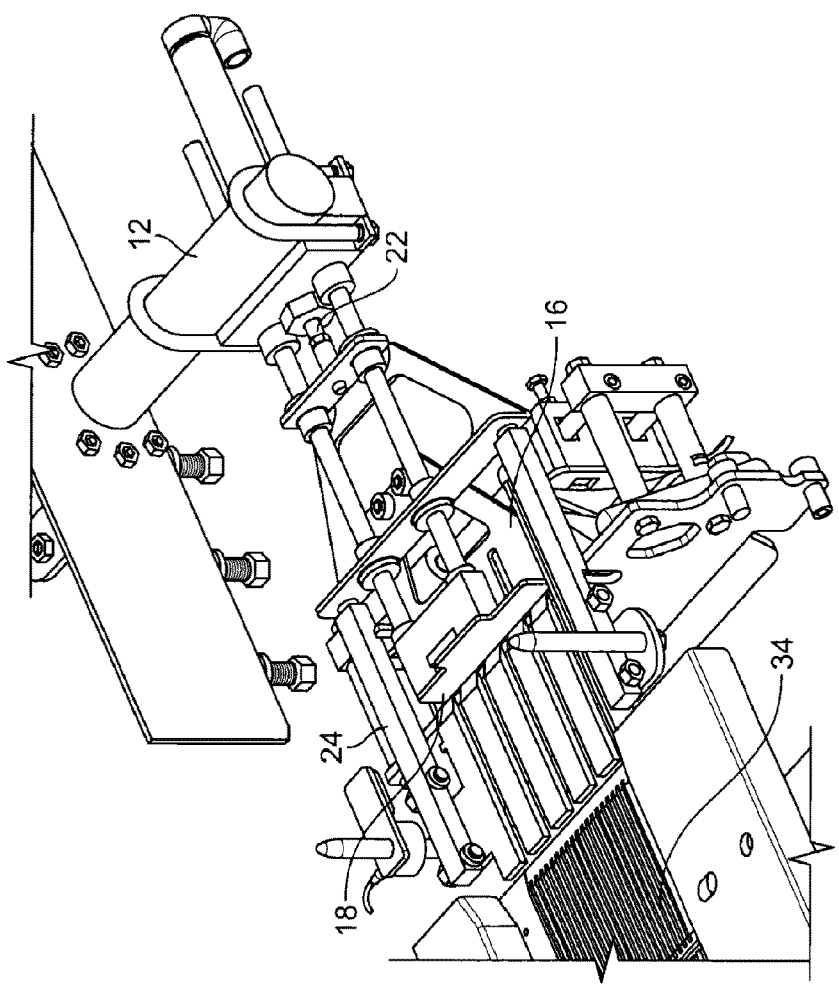
FIG. 2 is another perspective view of the improved pusher apparatus shown in FIG. 1.

The operation of the improved pusher apparatus 10 may be seen with reference to FIGS. 1 and 2. The pusher is in constant back and forth motion between a "home" position shown in FIG. 1, and an "extended" position shown in FIG. 2. The pusher is driven by a cam and oscillating arm arrangement 12, the operation of which would be well understood by one of ordinary skill in the art. Frame 14 is connected to oscillating arm 12 through one or more rod members 20, and an air cylinder 22, at rear panel 28. Horizontal slider plate 16 is affixed to frame 14, for example by one or more screw-nut assemblies 30.

Pusher unit 18 is connected to arm 12 by the rods 20, which pass through apertures in rear panel 28 and forward panel 32 via outer bushings 26a and inner bushings 26b, but pusher 18 is not operationally connected to air cylinder 22. Thus pusher unit 18 can move independent of frame 14 and horizontal slider plate 16 as discussed below.

The improved pusher apparatus operates as follows. As a sandwich is delivered upward through the wrapping head by the elevator, arm 12 operates to move the pusher apparatus 10 to the left as shown in FIGS. 1 and 2. As the apparatus moves toward the left, horizontal slider plate 16 moves beneath the sandwich. This holds the sandwich in place as the elevator descends and creates the first bottom tuck fold of the paper in a manner known in the prior art. As the apparatus continues to the left, pusher unit 18 contacts the back of the sandwich. This moves the sandwich toward staging area 36.

As the leading edge of horizontal plate 16 meets the vertical back wall of the wrapping head, forward panel 32 contacts stationary stop 24, compressing air cylinder 22 and preventing further leftward movement of horizontal plate 16. Pusher unit 18, however, continues to the left, moving the sandwich off the horizontal plate 16 and delivering the wrapped sandwich to staging area 36 located before the heated platen 34. This movement eliminates the need for a hold-back mechanism as is used in prior art machines. Pusher unit 18 then starts to retract toward the home position pursuant to the operation of the cam and oscillating arm 12. During the retraction operation, horizontal plate 16 is extended by the air cylinder 22 as it moves away from the stationary stop 24.

In a basic embodiment of this aspect of the invention, rods 20 are comprised of a stainless steel composition and bushings 26a and 26b are comprised of plastic, and the apertures in panels 28 and 32 are circular to closely fit bushings 26a and 26b. However, in operation it has been discovered that it is often difficult to set rods 20 in a perfectly parallel arrangement, and that occasionally the rods themselves may not be perfectly straight. This can lead to degradation of the performance of the rods and bushings during operation. It has therefore been discovered, in a more preferred embodiment of this aspect, that one or more of the bushings 26a and 26b may be comprised of bronze, and that one or more of the apertures in panels 28 and 32 may be slotted rather than circular to allow for rod misalignment. Although it is not believed to be critical which bushing is bronze or which aperture is slotted, in practice, the inner bushings 26b have been made of bronze and the apertures surrounding the outer bushings 26a have been slotted.

Coupled and Air-Compressed Wrapping Paper Feed Rollers

Figure 3:
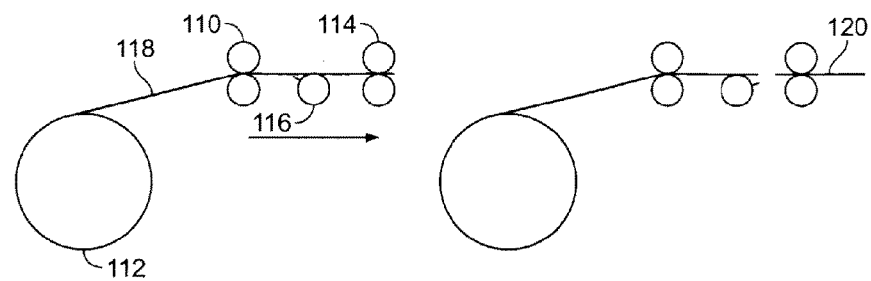
FIG. 3 is a diagrammatic view of the paper feeding operation in a prior art machine.

Another aspect of the present invention involves mechanically coupling the primary and secondary wrapping paper feed rollers with a speed-up ratio. Sandwich machines require the over-wrap paper to be cut from a supply roll into sheets for the purpose of wrapping the sandwiches. Two nip rollers and a rotating knife blade perform this function. As shown representatively in FIG. 3, as is commonly known in the prior art, the first (primary) roller 110 meters the paper 118 from the supply roll 112 and positions the paper 118 for cutting. The second (secondary) roller 114 is designed to pull tension on the paper 118, while the rotary knife 116, located between the rollers 110 and 114, cuts the paper 118, resulting in a cut sheet 120. The secondary roller is also used to accelerate the cut sheet 120 away from the knife 116 and out into the wrapping section of the filling machine.

Secondary roller 114 is driven at a higher speed than primary roller 110 in order to provide pulling tension. Secondary roller 114 should have less friction than the primary roller to allow the wrap to slip. Once the sheet is cut, however, the paper stops slipping and is accelerated. It is critical for the operation of the machine that the cut sheet 118 be fed into the wrapping device at the correct time in the machine cycle.

In a typical prior art machine, in use for decades, the primary and secondary rollers 110 and 114 and the rotary knife 116 are coupled together at a fixed rate in a common mechanical drive, which is attached to the main machine drive. The proper machine timing and speed ratios are maintained through the use of timing belts, chains or gearing. In recent years, however, some customers have demanded that sandwich machines be able to run "registered" wrap, which has prompted design changes in the paper feeding mechanism. Registered wrap has a mark printed on it to facilitate a sensor determining the position of the wrap. The wrap may then be cut at the necessary spot to correctly position the wrap printing on the sandwich. Registration is not new to the industry, and is typically accomplished by varying the timing of the web as it passes by the knife.

Typical application of registered wrap will not work on an ice cream sandwich-making machine, however, where the primary and secondary paper rollers and the knife roller are all linked together by a common drive. A sandwich machine requires that the paper be cut and fed into the wrapping section precisely at the correct time. Therefore, in existing prior art designs, the primary roller 110 has been designed to operate independently so that it may correctly position the paper for cutting, while the rotary knife 116 and the secondary roller 114 are mechanically coupled to the machine as before.

Bringing the paper "into registration" requires moving the paper to the correct position at the time the knife contacts the paper. This must be done at start-up as well as continuously during operation to maintain registration. Therefore, the primary roller will need to accelerate or decelerate momentarily during operation as the control system dictates.

Prior art machines which couple the knife and secondary roller to the main filler may suffer in performance when the registration correction is made by the primary roller. At start-up, the primary roller may actually move the paper faster than the secondary roller takes it away. This may cause the paper to accumulate in the drive and jam, or cause the paper to be too slack to be cut.

Figure 4:
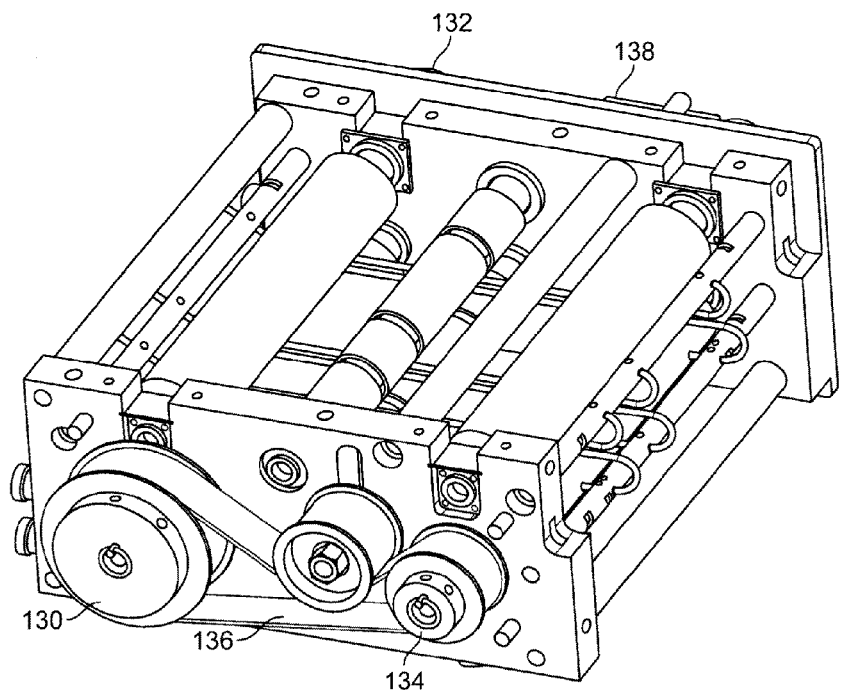
FIG. 4 is a perspective view of a coupled paper feeder drive system.

This problem has been eliminated in the present invention by providing an improved machine in which the primary and secondary rollers are coupled with a timing belt, as shown in FIG. 4. In FIG. 4, primary roller 130 is driven and is coupled to secondary roller 134 through belt 136. The two rollers act together to control the paper position for cutting, while maintaining constant tension on the paper web and preventing paper jams. Knife drive 138, however, is not connected to roller drive 132 or to primary and secondary rollers 130 and 134, but remains mechanically driven by the main machine drive, thus maintaining proper cut-sheet delivery into the wrapping section of the machine.

A further improvement to the paper roller apparatus relates to improved control over the pressure on the rollers. As discussed above with respect to FIG. 3, secondary roller 114 must rotate faster than primary roller 110 in order to draw paper 118 from primary roller 110 under tension, but it must not cause the paper to slip in primary roller 110, or the length of cut sheet 120 will be incorrect. Therefore primary roller 110 must always grip the paper 118 more tightly than the secondary roller 114. This is accomplished by placing more pressure on the primary rollers than on the secondary rollers. Commonly in the prior art, this is accomplished through the use of mechanical compression springs 140, as shown representatively in FIG. 5.

However, paper feeding problems will occur if the pressures are not correct and even. Too high a pressure will cause cut sheet 120 to wrinkle and not fold properly around the sandwich. Uneven pressure from side-to-side will cause the paper to run off-center so that cut sheet 120 will be improperly placed on the sandwich. Additional complications occur with the use of various wrap materials and coatings (plastic film, metalized plastic, and foil, etc.). Proper setting of the roller pressure is therefore critical to the optimal function of the ice-cream sandwich making machine.

Figure 5:
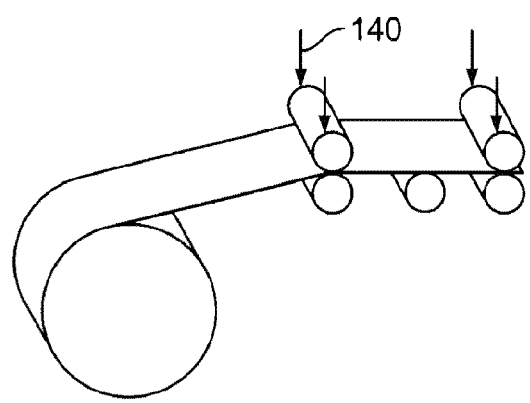
FIG. 5 shows a perspective diagrammatic view of mechanical spring compressors in a prior art machine.

As noted above, the standard design used in prior art machines, as shown in FIG. 5, uses mechanical compression springs 140, typically with some type of threaded adjustment screw to apply pressure on the paper feed rollers. This is a mechanically robust method, but it has shortcomings. The required springs may vary somewhat in their mechanical properties and are difficult to set to the proper spring force, except by "feel" by a skilled mechanic. Varying the pressure to optimize the machine performance is difficult and time-consuming and is difficult or impossible to do while the machine is in production. Improper spring force is often the cause of poor paper-feed operation and machine down-time.

Figure 6:
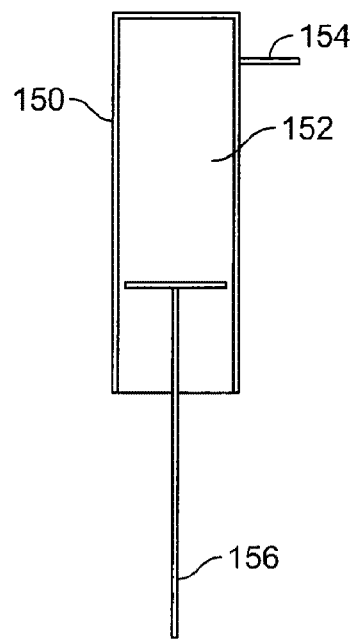
FIG. 6 is a diagrammatic elevational view of an air cylinder spring suitable for use in the apparatus.

The machine of the present invention solves these problems by utilizing air-cylinders as air-springs instead of mechanical compression springs. As shown in FIG. 6, an air cylinder spring 150 comprises a chamber 152 into which pressurized air may be introduced via a line 154. As the air pressure in chamber 152 increases, piston 156 is displaced downward, creating a linear mechanical force proportional to the air-pressure at the cylinder piston rod.

Air-pressure regulators commonly known are used in the present invention to provide a constant pressure that can be easily set to a known value indicated on a pressure gauge. A first pressure would be used for both air-cylinders on the primary roller, and a second, lesser pressure would be used for the secondary roller. The pressures required for the various wrap materials or conditions can easily be set by adjusting the regulators or through an automatic control system utilizing multiple regulators and appropriate valves or with electronically adjustable pressure regulators.

Sensors for Detection of Low Paper

Figure 7:
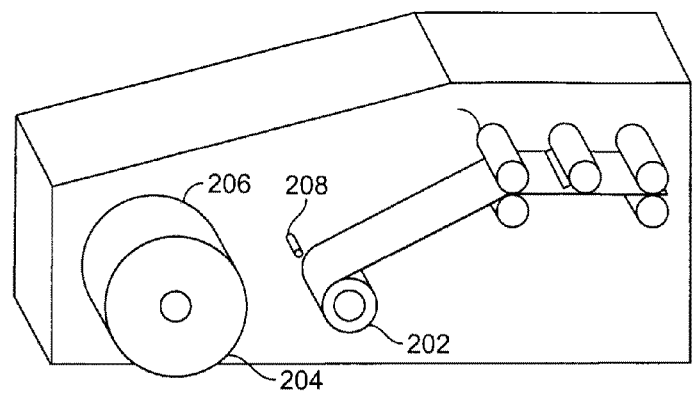
FIG. 7 is a diagrammatic perspective view of an apparatus for detecting low paper.

Another aspect of the present invention relates to the replacement of the supply roll of wrapping paper. As shown in FIG. 7, sandwich machines are typically supplied with two supply-roll mounts 202 and 204 in order to allow the machine to be run continuously by making on-the-fly splices from one roll to the other as the first roll runs empty. This operation is performed manually by the machine operator. However, the operator must remain alert in order to be prepared to make the splice before the paper runs out completely.

One way to accomplish this task without the need for constant operator attention would be by mounting photo-electric or mechanical switches 206 and 208 near the center of the supply rolls between the vertical face of the machine cabinet and the rolls. When the roll runs nearly empty, the sensors detect the condition and trigger an indication for the machine operator. For example, as shown in FIG. 7, sensor 208 will have been tripped by the fact that roll mount 202 is nearly empty.

There are several problems with this design. The sensors 206 and 208 are exposed to physical abuse while loading the rolls and during cleaning operations. The sensors are also exposed to corrosive chemicals during clean-up. The sensors tend to fail often or can become broken or misaligned.

This problem has been solved in the present invention by utilizing an existing machine component as a roll-near-empty sensor. Paper-feed systems in present machines use some means to provide drag on the paper supply roll. Typically, as shown in FIG. 8, this is accomplished through the use of one or two paddles 210, which apply radial pressure on the paper roll 204 by means of an air cylinder.

Figure 8:
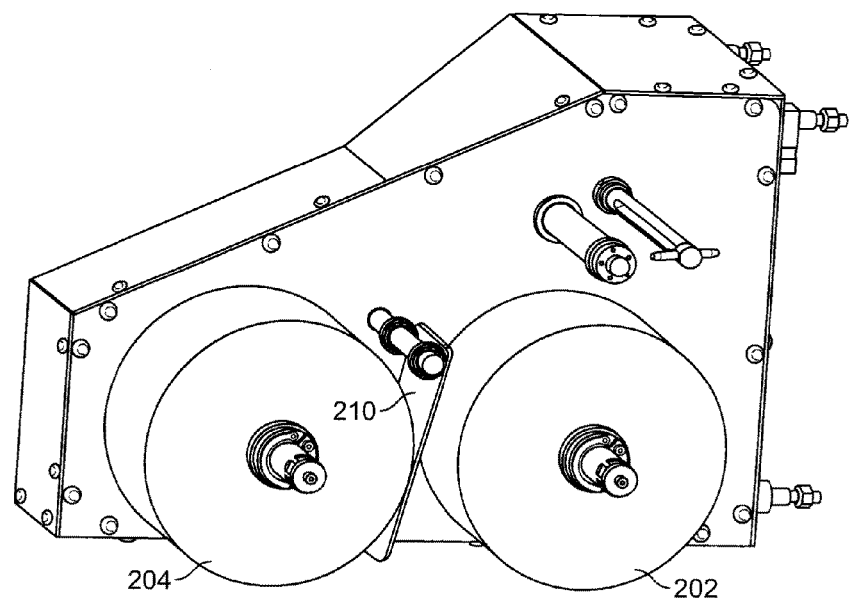
FIG. 8 is a perspective view of an improved apparatus for detecting low paper.
Figure 9:
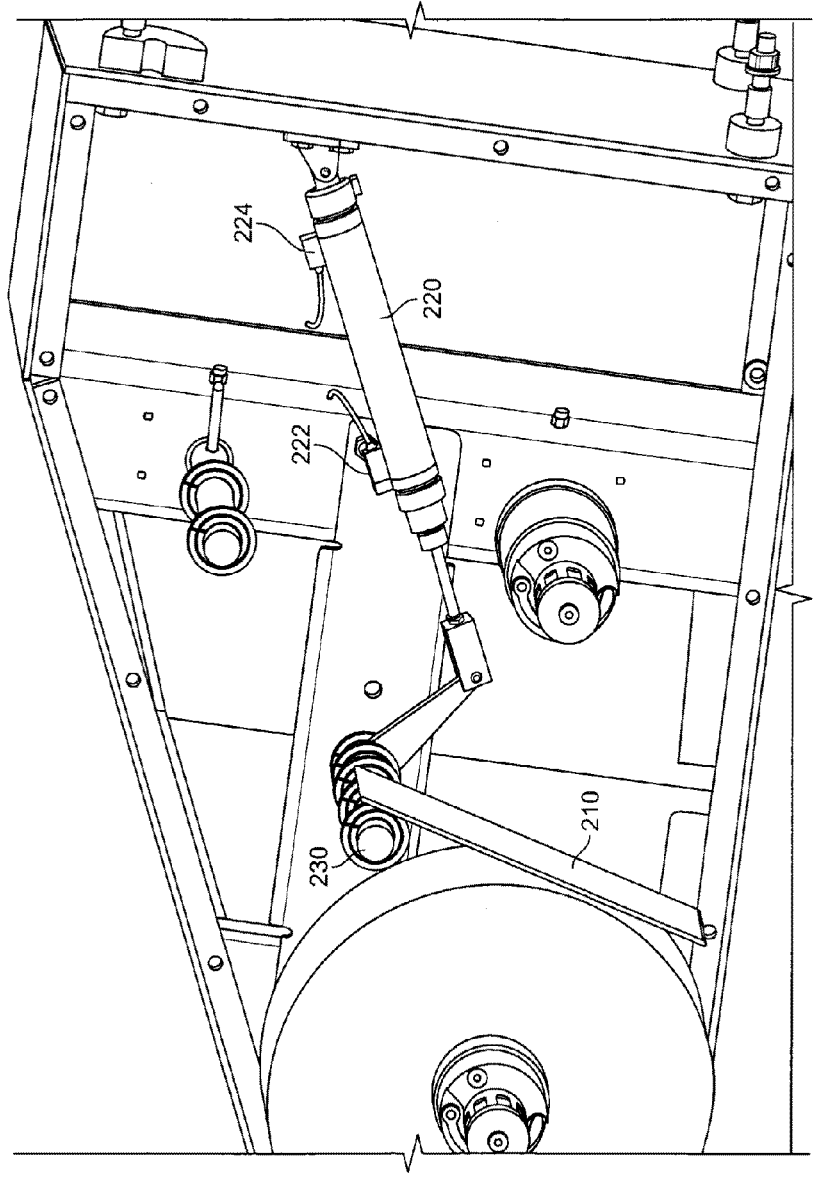
FIG. 9 is perspective interior view of the apparatus shown in FIG. 8.

In the present invention, as shown in FIGS. 8 and 9, a single paddle powered by an air-cylinder is used. The paddle 210 pivots about a central member 230 and is biased toward roll 204 by an air-cylinder 220, which is equipped with sensors 222 and 224. As the paper is dispensed from roll 204, air cylinder 220 acts to move paddle 210, and sensors 222 and 224 detect the change in position of the cylinder 220 caused by the change in position of paddle 210. These sensors can be calibrated to indicate when the paper rolls reach a desired state. Sensors 222 and 224 positioned inside the machine frame, such as those shown in FIG. 9, as opposed to outside the frame, will be subject to far less abuse than those mounted near the center of the supply rolls, resulting in a more robust system.

Parking of Wrapping Paper

Another aspect of the present invention comprises a method to "park" the wrapping paper for cleaner operation after stopping the filling machine. A typical prior art sandwich machine has a main drive to operate the machine, and a paper-feed which can be stopped and started independently. The main machine drive must be started, and sandwiches brought to the wrapping area before the wrap is turned on. Running the wrap without sandwiches present is wasteful and may cause the cut sheets of paper to jam in the wrapping mechanism. The paper-feed may be driven from the main drive and stopped and started by use of a clutch mechanism, or utilize a completely independent drive motor, as is known in the prior art.

Sandwich machines capable of running registered wrap must use an independent drive for the paper-feed rollers in order to correct the wrap print location as it is presented to the knife. The knife is driven by the main filler drive and rotates whenever the main drive is on.

When the main drive is on and the paper feed drive is stopped, the knife damages the leading edge of the paper still in the paper-feed rollers. The knife may also cut small pieces of paper which accumulate in the paper-feed area and can cause feeding problems which require a shut-down to clean, or else the product may become contaminated.

The knife could be de-coupled from the main drive with a clutch to prevent damaging the paper web, but this solution has several drawbacks. A sandwich machine is a complex machine that can be difficult to service and maintain. Adding a clutch or independent drive to the knife would be expensive and make the machine more difficult to service or require the machine to be physically larger. Operators prefer as small a machine as possible.

As shown in FIG. 10, the present invention includes a method for preventing damage to the paper web when stopping the paper-feed drive. The machine control system (not shown) monitors the position of the main machine drive (not shown) through methods known in the prior art and times the stop signal to the paper feed so that the last cut sheet will be released to be wrapped at the stopped position. Thus, FIG. 10A shows the system in normal operation, just before the paper is cut. FIG. 10B shows the system just after the paper is cut. These figures are similar to the operation shown in FIG. 3, above.

FIG. 10C shows the system in a stop position after the cut sheet has been released from the secondary rollers. The control system can then direct the paper-feed drive to immediately reverse a small amount to "park" the paper out of the way of the rotating knife blade, as shown in FIG. 10D. The adjustments needed to be made to any typical control system used in controlling ice cream sandwich-making machines to accomplish this aspect of the invention would be well understood by one of ordinary skill in the art.

Hinged Exit Tray

Finally, another aspect of the present invention involves the use of a hinged exit tray to allow easier access to the underside of the exit tray and paper feed mechanisms on a sandwich-making machine.

An ice-cream sandwich machine is a highly mechanized and complex device which must be thoroughly cleaned every day. In order to accomplish this, some disassembly is normally required. One of the components normally removed for cleaning is the exit tray. The exit tray is a mechanical assembly that performs several functions. First, it guides and supports the wrapped sandwiches as they exit the filler. The exit tray also comprises the heated platen, which provides heat for the bottom heat seal of the sandwich wrapper. As such, the exit tray is usually bulky and heavy (often between 40 to 50 pounds) and is cumbersome to remove for cleaning. Dairies therefore have the choice of removing the tray for cleaning, exposing personnel to injury and the equipment to damage, or not doing so, and making sanitation more difficult. The tray also must be removed to gain access to the paper feed drive unit located below the tray, either to clear jams or for maintenance and inspection. Prior art tray designs comprise a tray assembly bolted to the filler. To remove the tray, it must be unbolted and the heating units removed.

Figure 11:
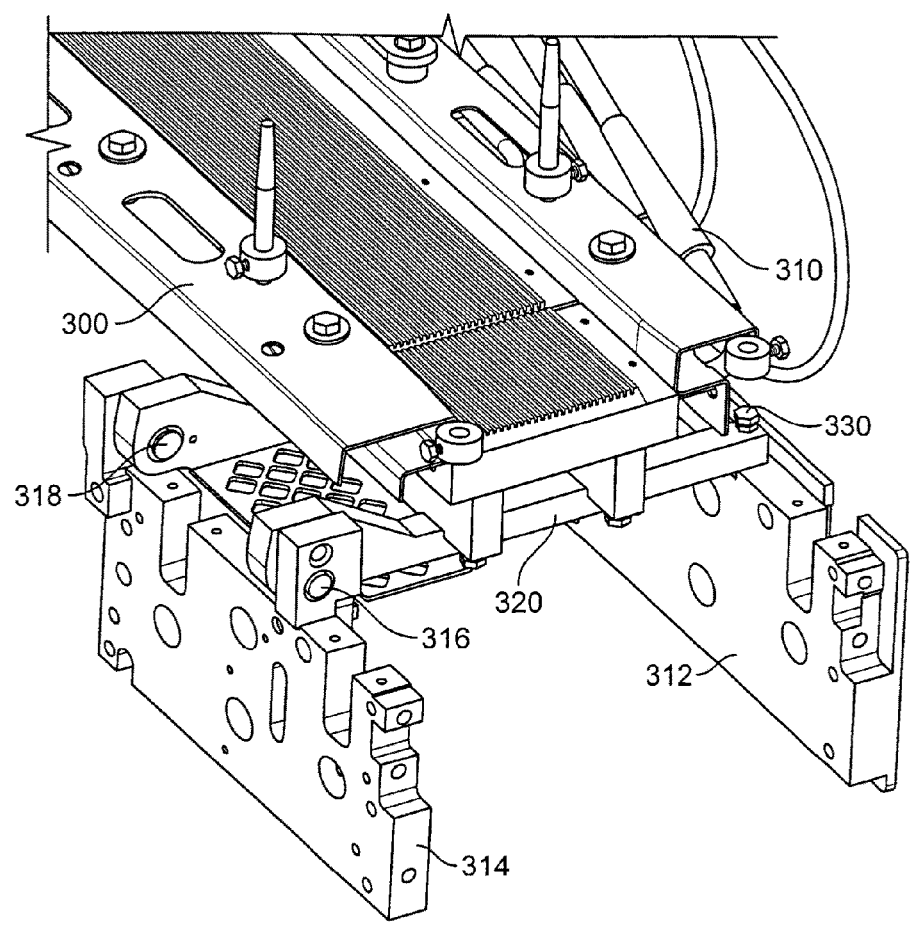
FIG. 11 is a perspective view of an exit tray assembly.
Figure 12:
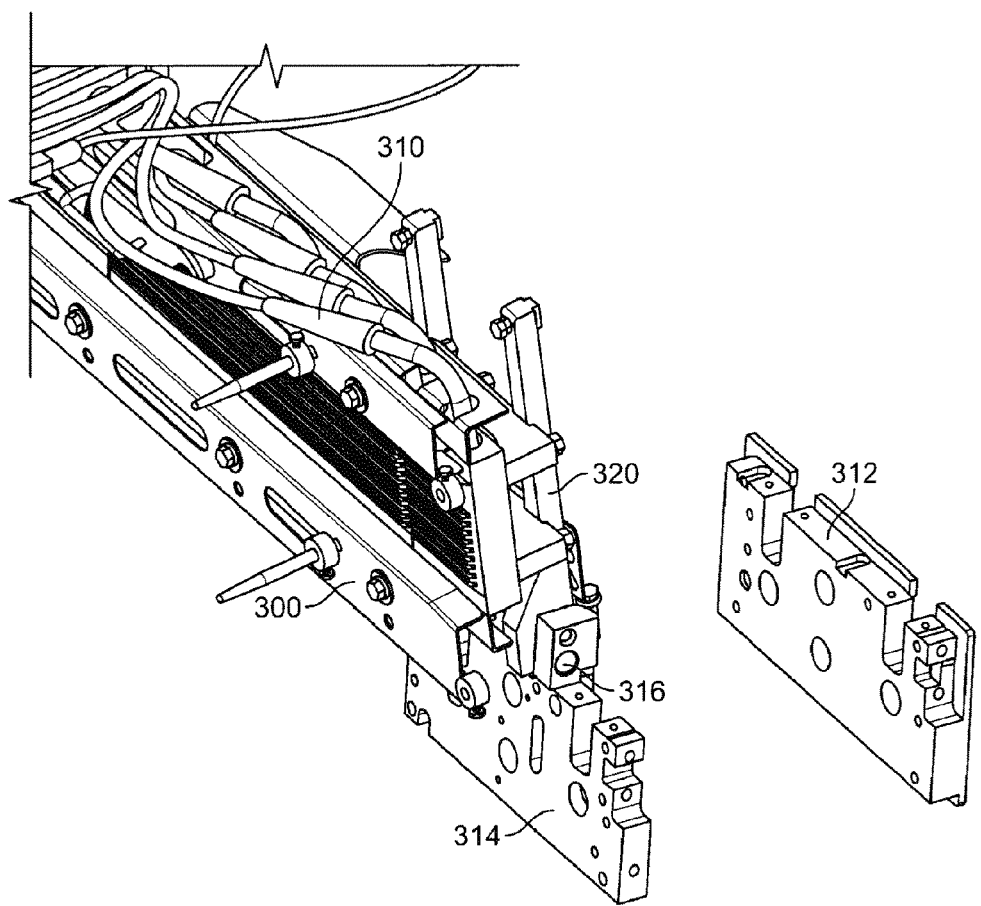
FIG. 12 is a perspective view of another exit tray assembly.
Figure 13:
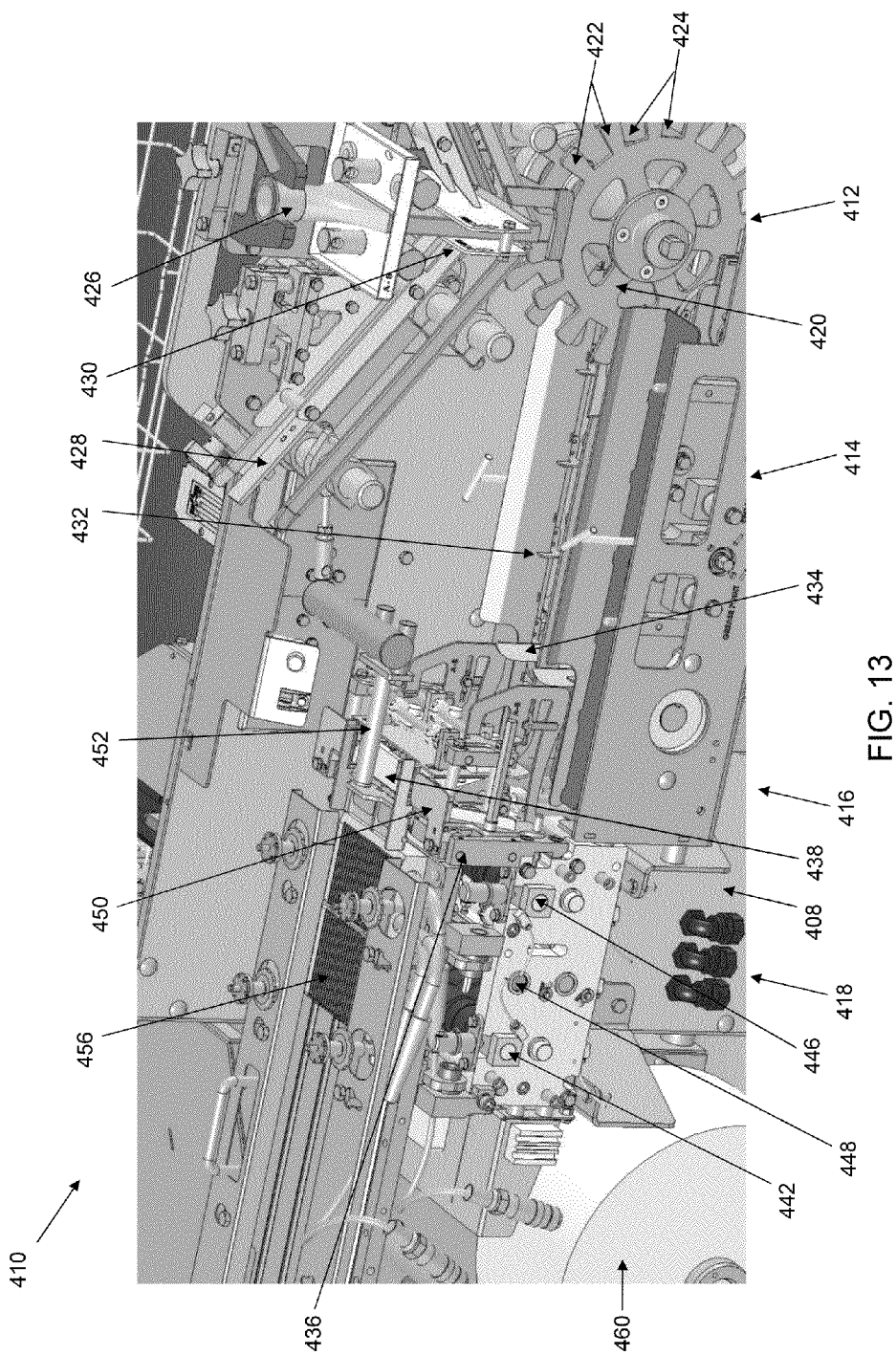
FIG. 13 is a labeled perspective view of the ice cream sandwich machine.
Figure 14:
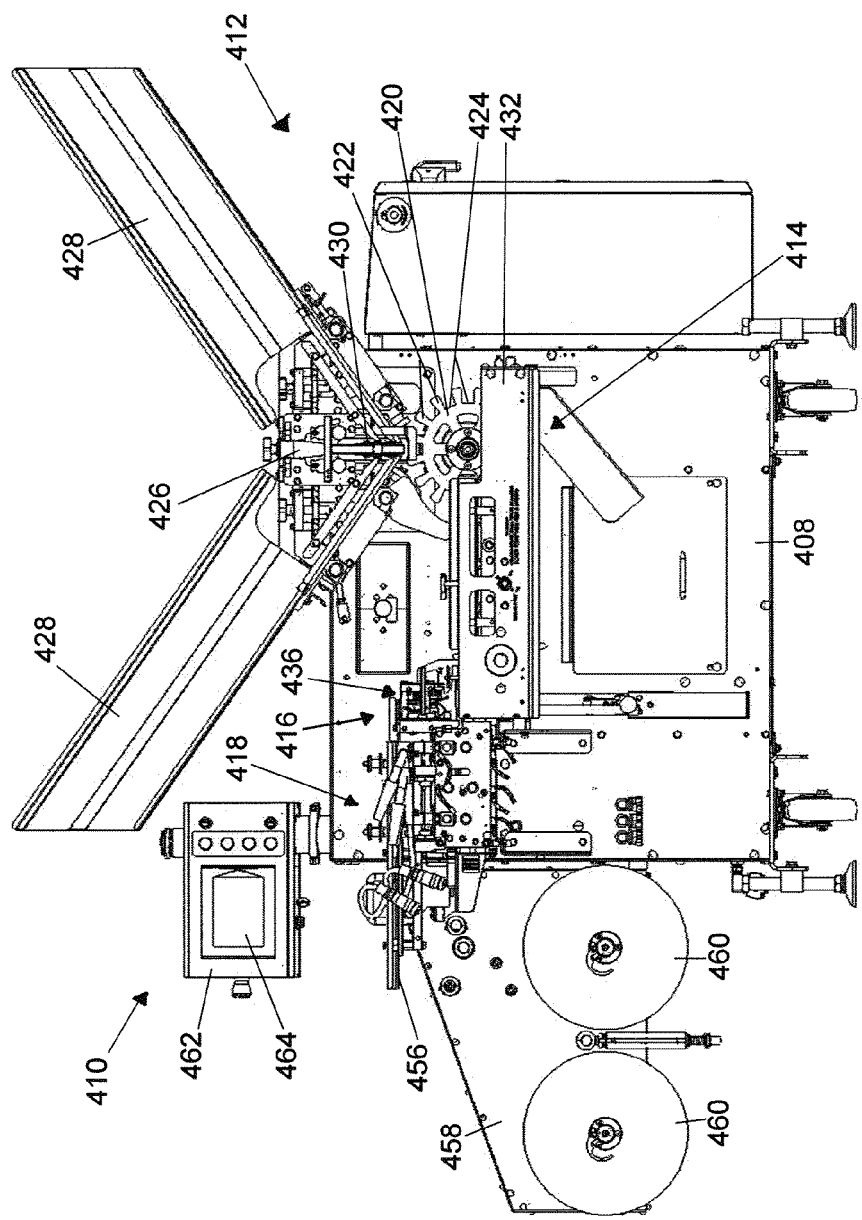
FIG. 14 is front elevational view of the ice cream sandwich machine shown in FIG. 13.
Figure 15:
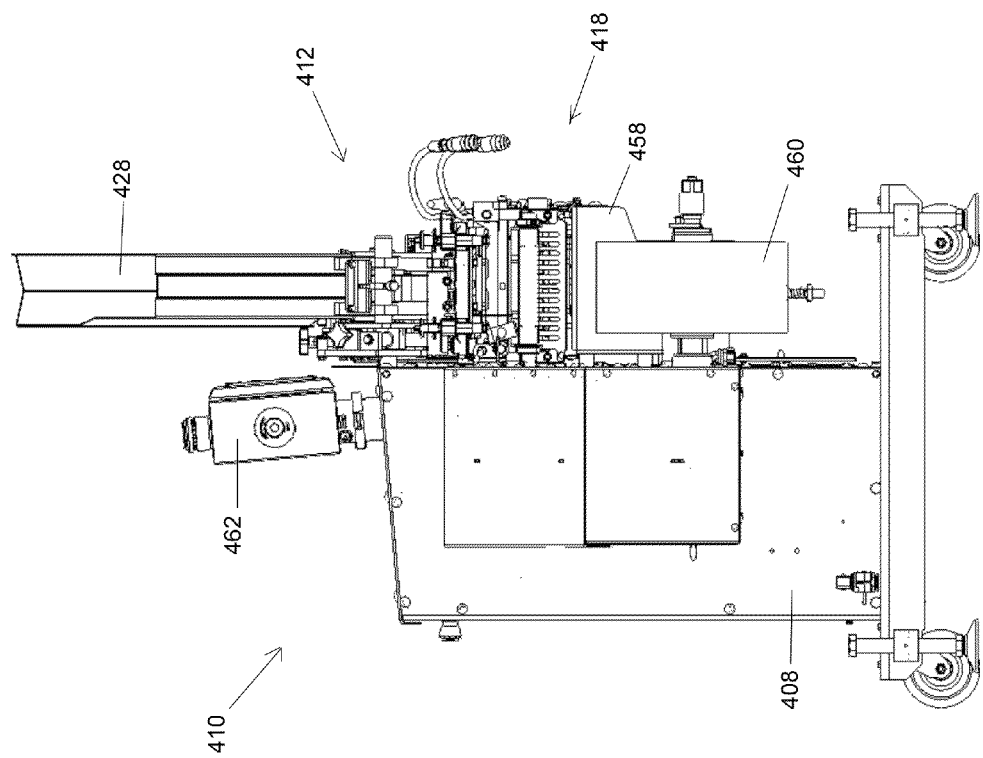
FIG. 15 is a left side elevational view of the ice cream sandwich machine shown in FIG. 14.
Figure 16:
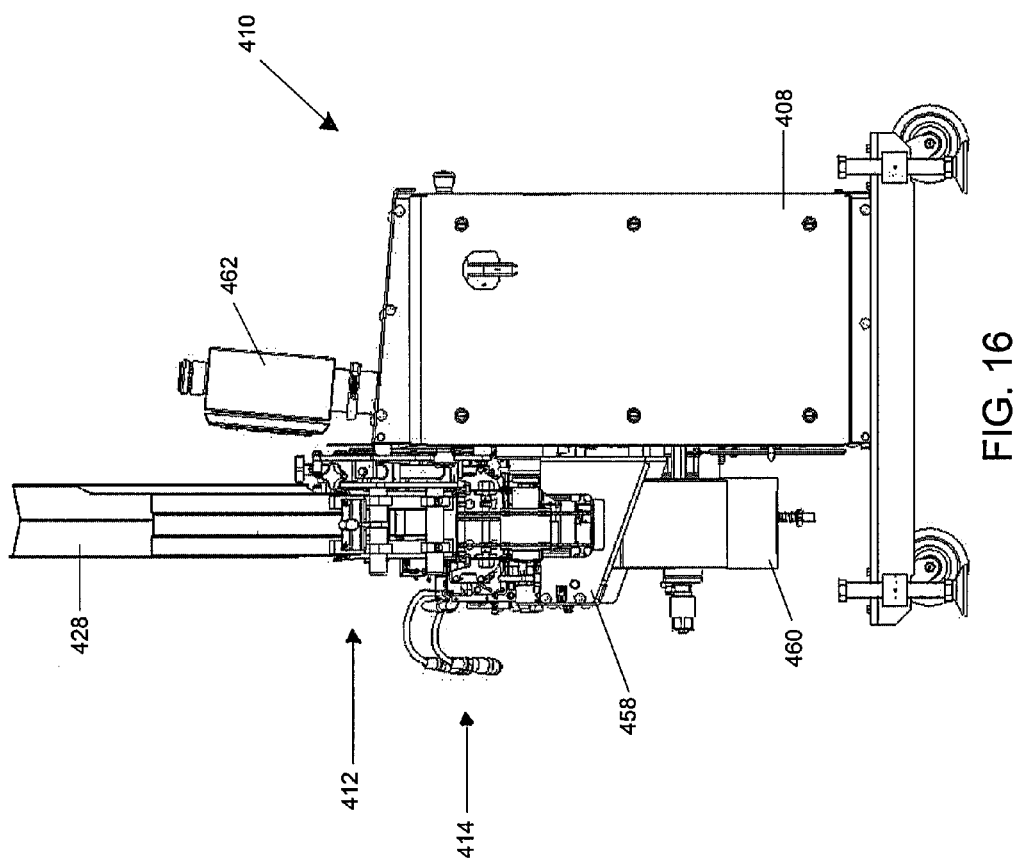
FIG. 16 is a right side elevational view of the ice cream sandwich machine shown in FIG. 14.
Figure 17:
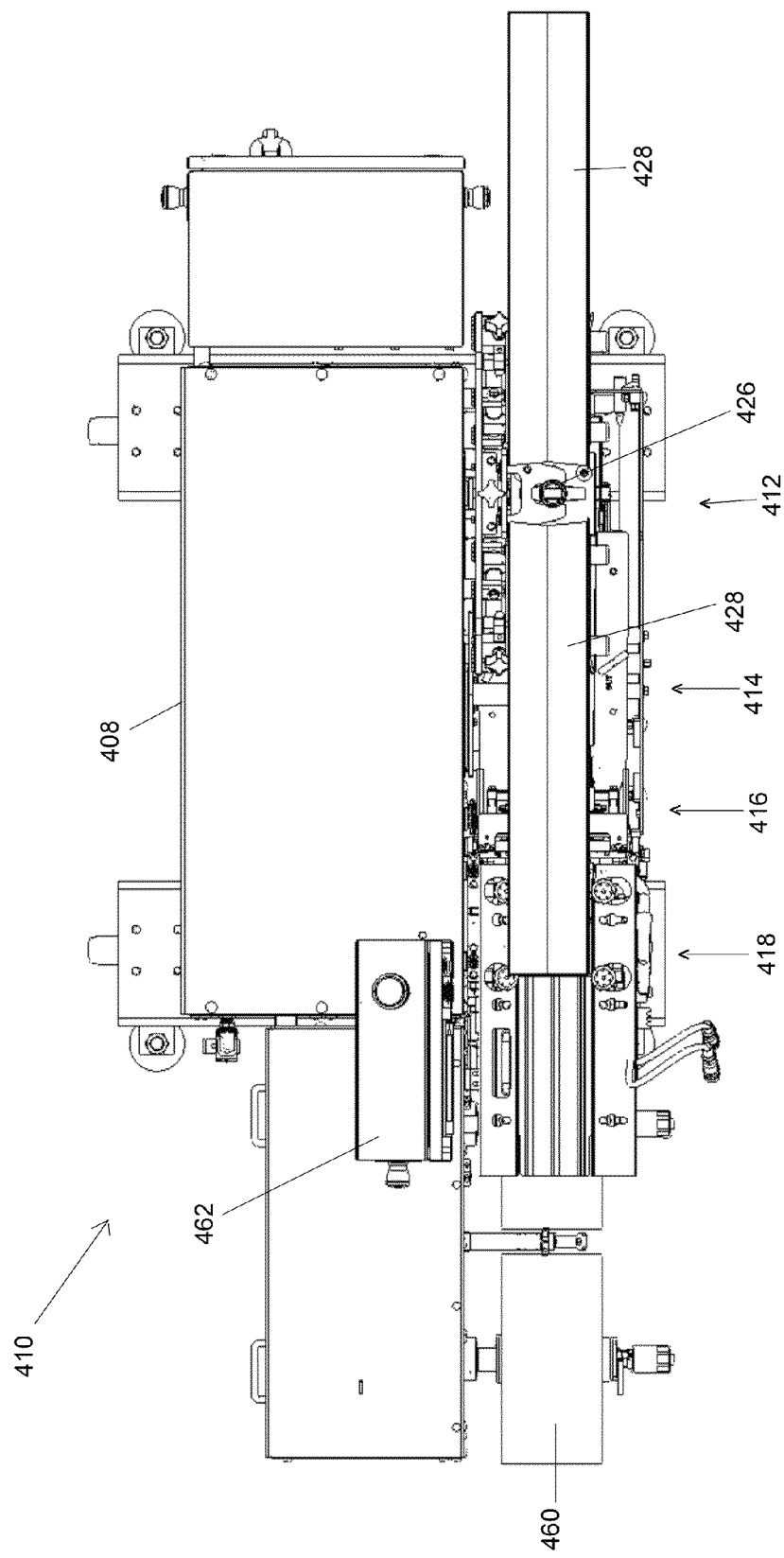
FIG. 17 is a top planar view of the ice cream sandwich machine shown in FIG. 14.
Figure 18:
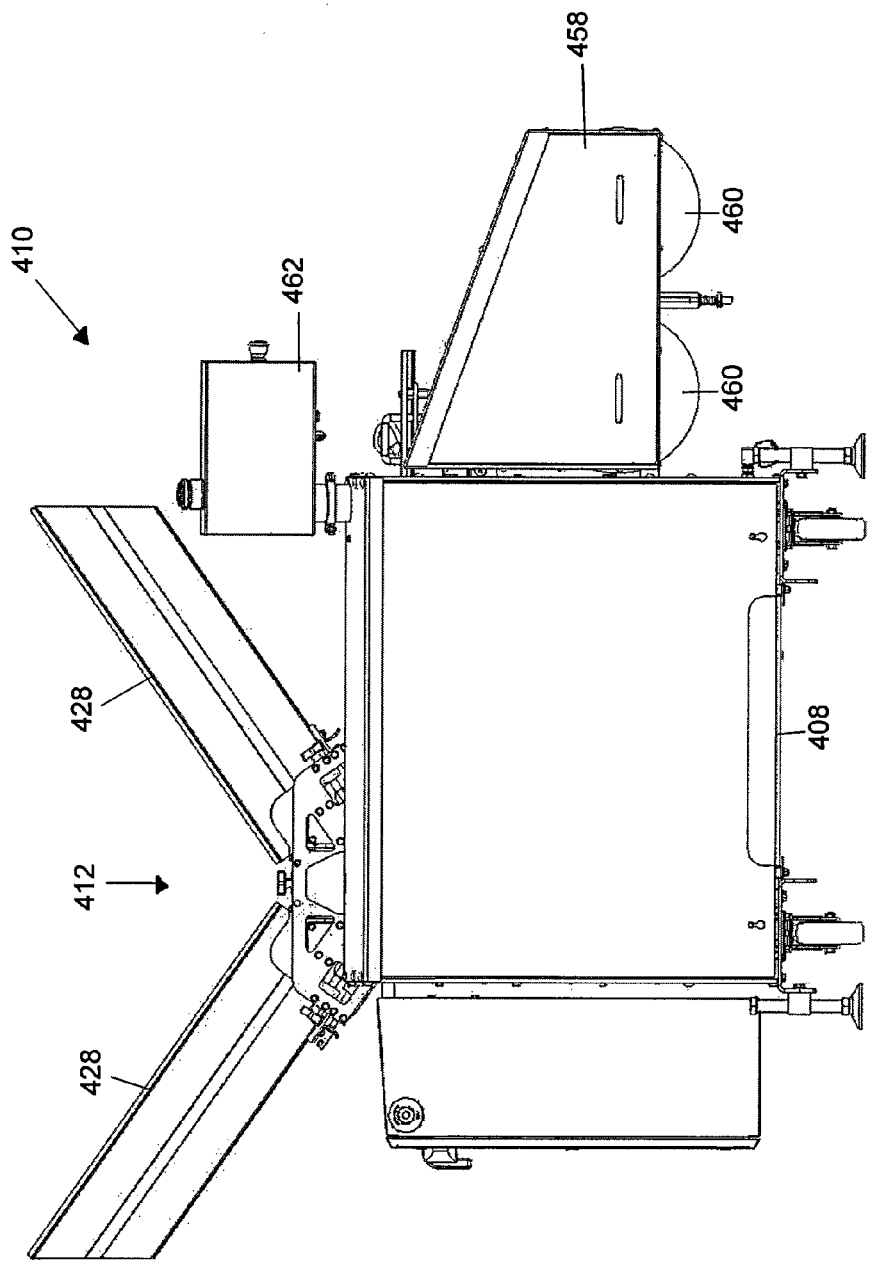
FIG. 18 is a rear elevational view of the ice cream sandwich machine shown in FIG. 14 with the rear cover in place.

In the improved tray shown in FIG. 11, an exit tray assembly 300, which includes cartridge heaters 310, is mounted rigidly on hinge arms 320, which are pivotably secured to paper feed frame 314 through hinges 316 and 318. The other end of the hinge arms 320 rests on paper feed frame 312. Adjustment screws 330 allow for the leveling of the tray. Thus, as shown in FIG. 12, in order to open the tray, the assembly 300 is rotated through the hinges 316 and 318.

The foregoing descriptions and figures are intended to be exemplary, and various modifications and changes may be made with regard to the foregoing descriptions without departing from the spirit of the invention.

Ice Cream Sandwich Apparatus

An ice cream sandwich apparatus 410 is shown in FIGS. 13-27. the ice cream sandwich apparatus 410 comprises a first station 412 for making ice cream sandwiches, a second station 414 for conveying the ice cream sandwiches, a third station 416 for wrapping the ice cream sandwiches, and a fourth station 418 for sheet feeding wrappers to the third station 416.

The first station 412 comprises a star wheel 420 having a plurality of fingers 422 and pockets 424 spaced apart and located around an outer periphery of the star wheel 420. The first station 412 further comprises a nozzle 426, a pair of chutes 428, and a pair of stripper plates 430, 430.

A stack of wafers are loaded into each of the chutes 428 and ice cream is pumped from a freezer (not shown) to the nozzle 426. Ice cream is pumped (e.g. with gear pump, not shown) through the nozzle 426, and extrudes between the pair of stripper plates 430, 430. The stripper plates 430, 430 reciprocate vertically and drive the wafers (stacked on each side of the nozzle) down on either side of the ice cream directed into the pocket 424 of the star wheel 420. The star wheel 420 then indexes one pocket, for example, counter-clockwise, and the shearing action of the right-most wafer cuts through the extruded ice cream, and an ice cream sandwich is formed. The star wheel 420 continues to index, and delivers the sandwich to the second station 414.

The second station 414 comprises a conveyor 432. The conveyor 432, for example, moves at a constant rate and delivers the ice cream sandwich to the third station 416. The conveyor 432 comprises tri-fingers 434, which share the conveyor shaft and rotate with the conveyor shaft to accurately transfer the ice cream sandwiches to the third station 416.

The third station 416 comprises a wrapper head 436. The wrapper head 436 comprises an elevator 438 having an elevator pad 440. The tri-fingers 434 transfer the ice cream sandwich to the elevator pad 440 of the elevator 438.

The wrapper head 436 further comprises a primary roller 442 that meters paper into the sheet feeder 444, a secondary roller 446 that grabs the paper and draws the paper tight (e.g. the secondary roller 446 rotates faster than the primary roller 442 to draw the paper tight), a rotary knife 448 located between the primary roller 442 and the secondary roller 446, a pair of tuckers 450, 450, and a pusher 452.

This arrangement produces a wrapper sheet (e.g. single sheet) that is fed out above the incoming sandwich. The elevator 438 lifts the ice cream sandwich up through the wrapper head 436, and guides and folds the single sheet of paper around the ice cream sandwich. The tuckers 450, 450 then close beneath the ice cream sandwich and fold in the paper around the ends of the ice cream sandwich. The pusher 452 then extends to the left folding in the bottom-right flap of paper with its leading lower portion. Once the back edge of the pusher 452 engages the right side of the ice cream sandwich, the sandwich is pushed to the left, creating the final fold on the bottom of the ice cream sandwich.

A hold-down plate 454 is located above the wrapper head 436, and maintains a light pressure on the ice cream sandwich as the final wraps are made. As the sandwich is pushed across a heat plate 456 located just to the left of the wrapper head 436, the heated plate 456 seals the bottom of the sandwich wrap, and the ice cream sandwich forming is complete.

The fourth station 418 comprises a reeler 458 for accommodating two (2) reels 460, 460 of wrapper paper.

An electronic control 462 with a display 464 is connected to an upper portion of the base/frame 8. Further, the ice cream sandwich apparatus 410 is provided with a removable back cover panel 466 to provide access to the interior of the base/frame 408.

Figure 19:
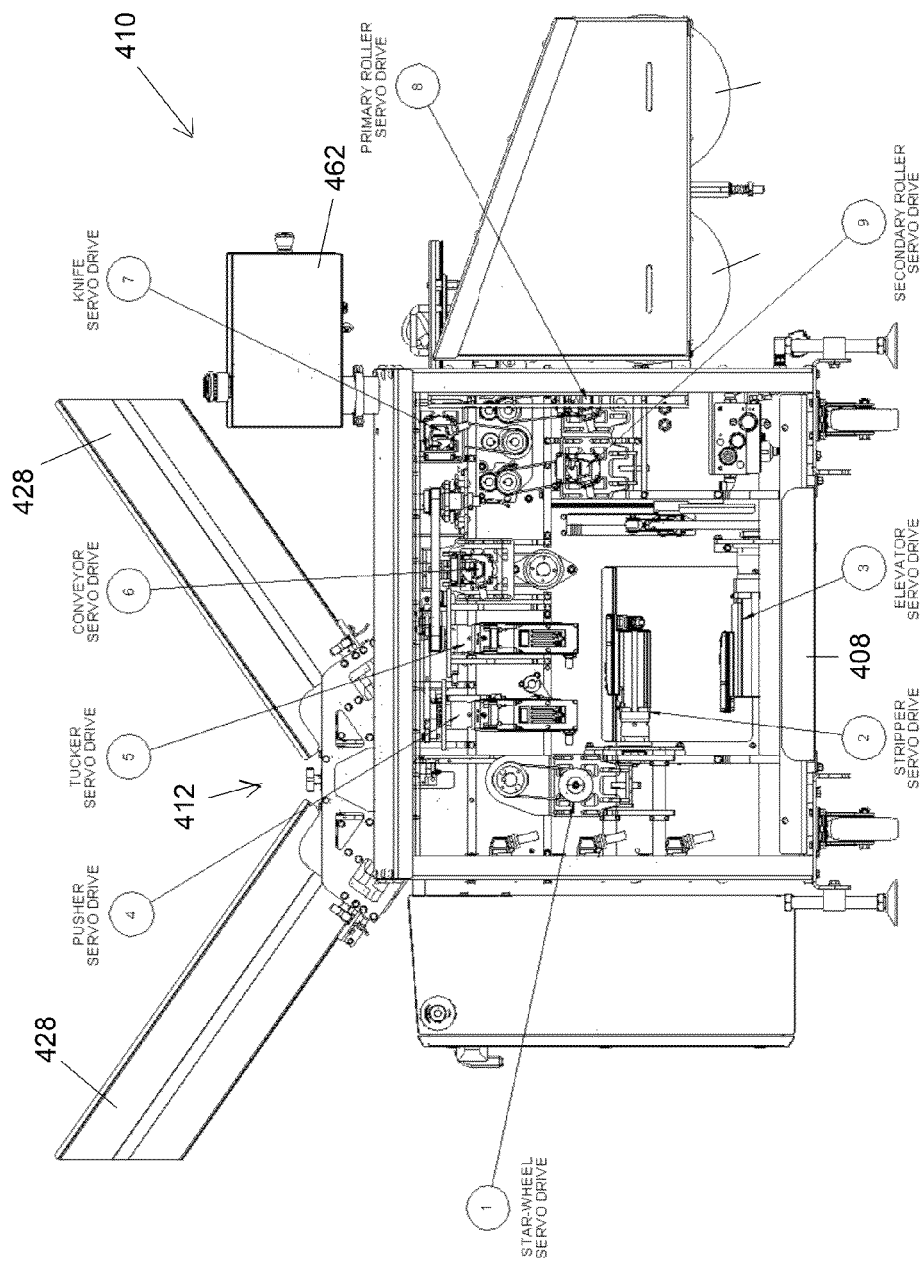
FIG. 19 is a rear elevational view of the ice cream sandwich machine shown in FIG. 14 with the rear cover removed.

The arrangement of the servo motor drives in the ice cream sandwich apparatus 410 is shown in FIG. 19. There are nine (9) separate servo motor drives indicated as follows:

| | |
|---|---|
| 1 - star wheel servo drive | Station 1 |
| 2 - stripper servo drive | Station 1 |
| 3 - elevator servo drive | Station 3 |
| 4 - pusher servo drive | Station 3 |
| 5 - tucker servo drive | Station 3 |
| 6 - conveyor servo drive | Station 2 |
| 7 - knife servo drive | Station 4 |
| 8 - primary roller servo drive | Station 4 |
| 9 - secondary roller servo drive | Station 4 |

Figure 20:
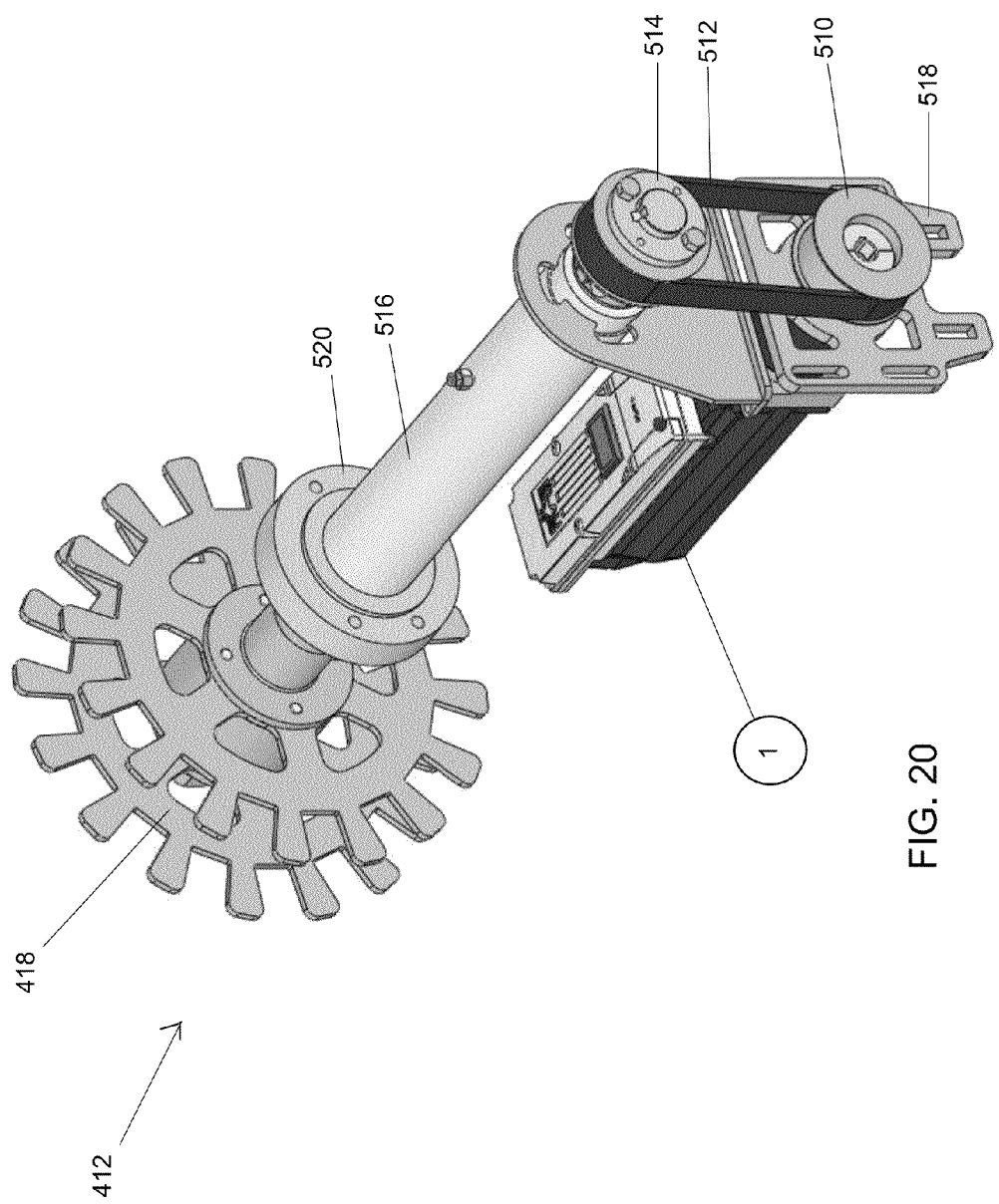
FIG. 20 is a perspective view of the servo motor drive for the star wheel of the first station.

The first station 412 comprises the star wheel 418 driven by servo drive 1, as shown in FIGS. 19 and 20.

The servo drive 1 is fitted with a pulley 510 driving a drive belt 512, and in turn drive a pulley 514 fitted on one end of a drive shaft 516. The servo drive 1 and drive shaft 516 are connected to a mounting bracket 518 to be connected to the base/frame of the ice cream sandwich apparatus.

The drive shaft 516 is fitted with a bearing for rotatably supporting the drive shaft 516 during operation thereof. The star wheel 418 is mounted on an opposite end of the drive shaft 516.

Figure 21:
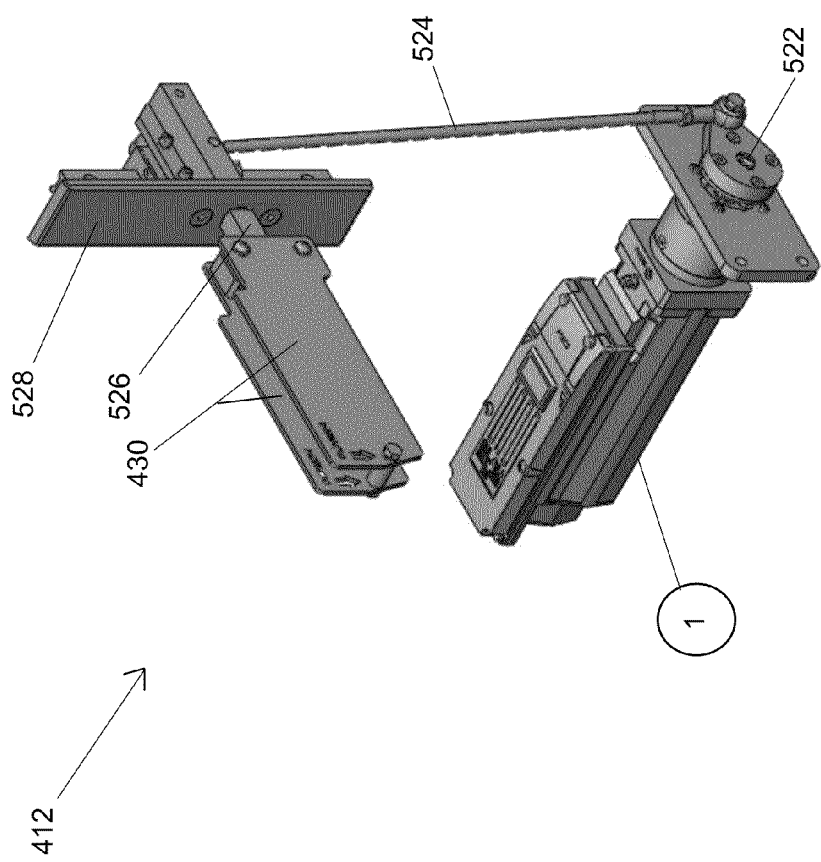
FIG. 21 is a perspective view of the servo motor drive for the wafer stripper of the first station.

The first station 412 also comprises a the pair of stripper plates 430, 430 driven by servo drive 2, as shown in FIGS. 19 and 21.

The servo drive 2 is fitted to a lever 522 connected to and driving a drive shaft 524. The stripper plates 430, 430 are connected to a shaft 526 mounted on a reciprocating shuttle 528. An opposite end of the drive shaft 524 is connected to the reciprocating shuttle 528.

Figure 22:
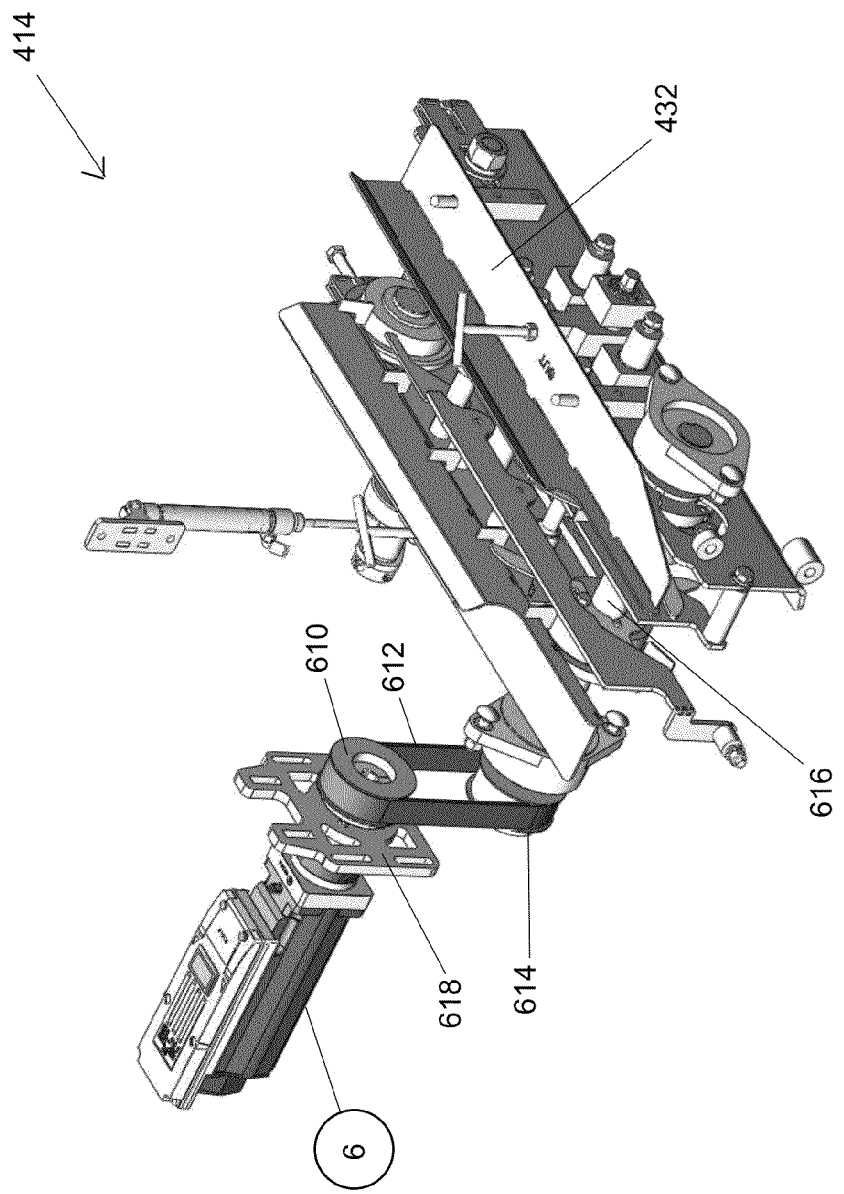
FIG. 22 is a perspective view of the servo motor drive for the conveyor of the second station.

The second station 414 comprises a conveyor 432 driven by the servo drive 6, as shown in FIGS. 19 and 22.

The servo drive 6 is fitted with a pulley 610 driving a drive belt 612, which in turn drives a pulley 614 fitted on one end of a drive shaft 616 for driving the conveyor 432. The servo drive 6 is connected to a mounting bracket 618 to be mounted on the base/frame of the ice cream sandwich apparatus.

Figure 23:
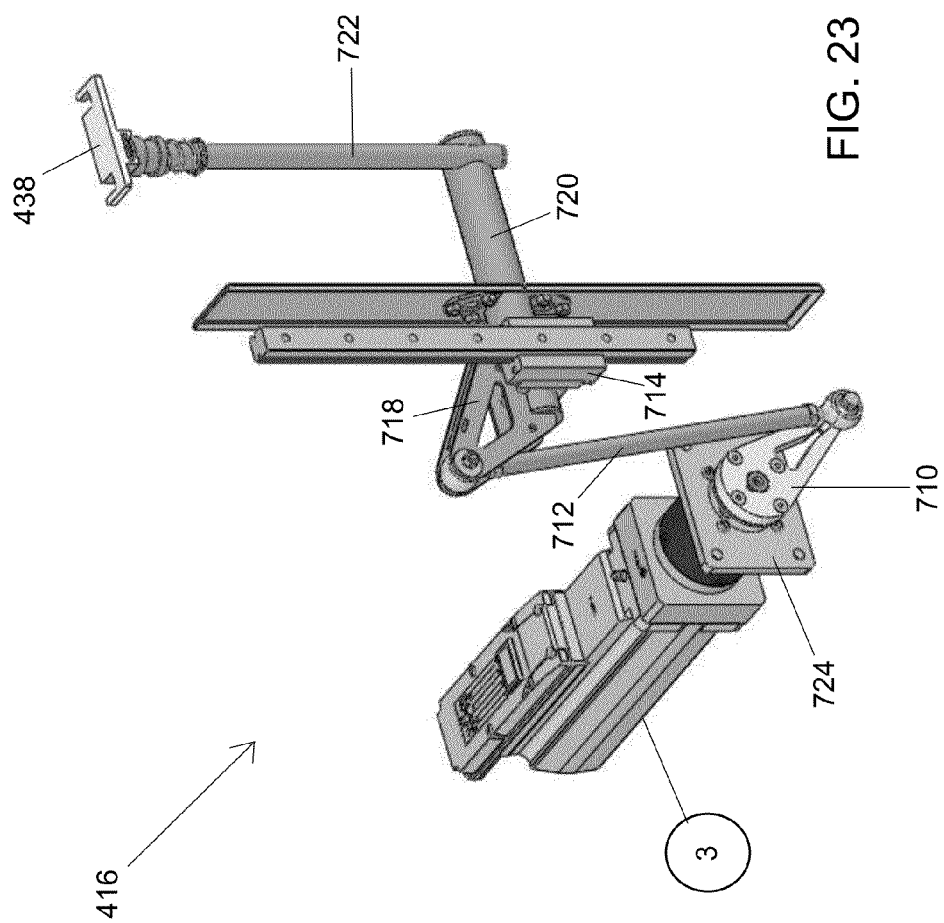
FIG. 23 is a perspective view of the servo motor drive for the elevator of the third station.

The third station 416 comprises the elevator 438 driven by the servo drive 3, as shown in FIGS. 19 and 23.

The servo drive 3 is fitted with a lever 710 driving a pushrod 712 pivotably connected at one end to the lever 710. A reciprocating shuttle 714 is slidably mounted on a vertical guide rail 716. The reciprocating shuttle is provided with a lever 718 pivotably connected to an opposite end of the pushrod 712. A horizontal shaft 720 is connected to the shuttle 714 at one end and connected to a vertical shaft 722 at an opposite end thereof. The elevator pad 438 is connected to the top of the vertical shaft 722. The servo drive 3 is connected to a mounting bracket 724, which is mounted to the base/frame of the ice cream sandwich apparatus.

Figure 24:
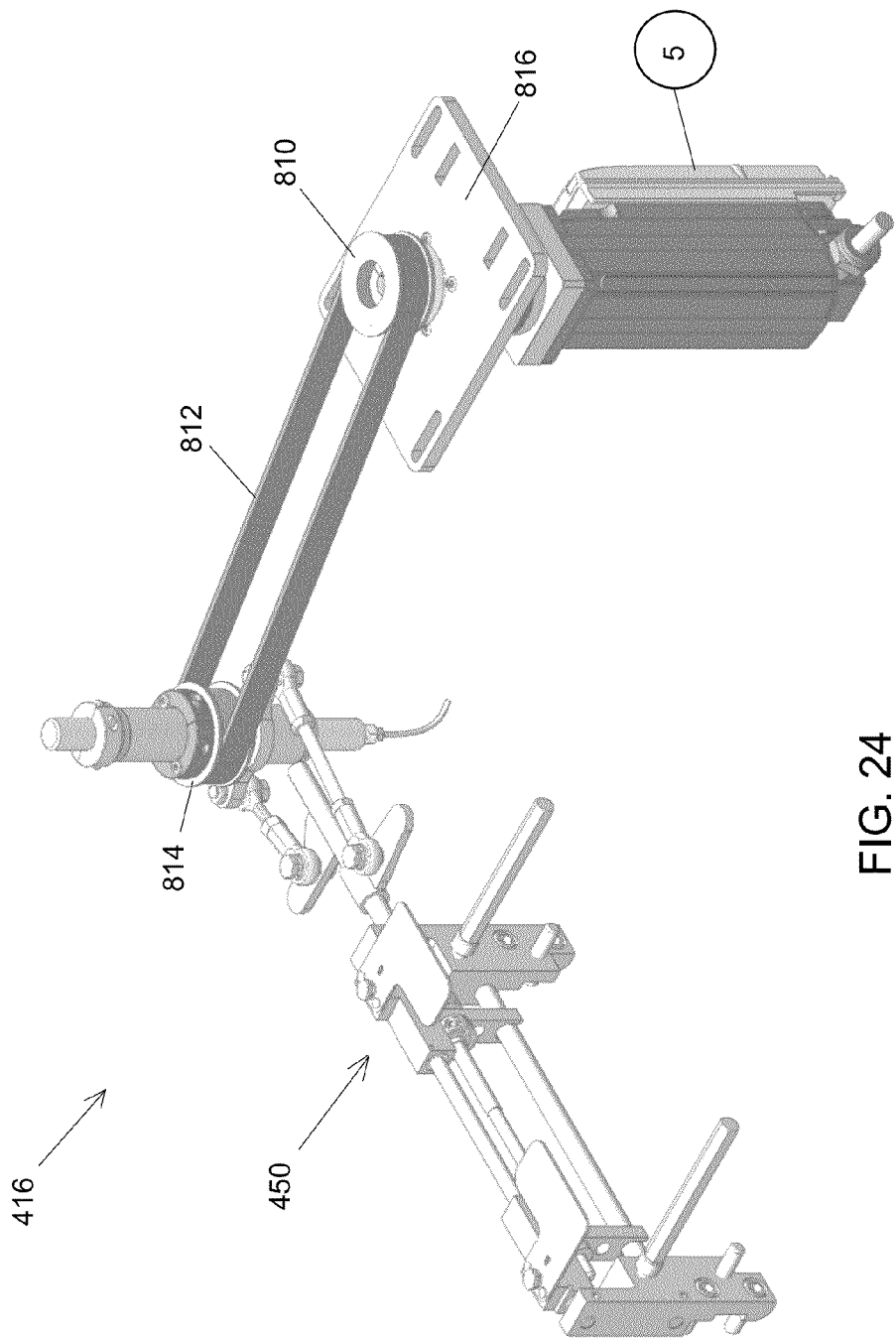
FIG. 24 is a perspective view of the servo motor drive for the tucker of the third station.

The third station 416 also comprises the tucker 450 driven by the servo drive 5, as shown in FIGS. 19 and 24.

The servo drive 5 is fitted with a pulley 810 driving a drive belt 812, which in turn drives a pulley 814 connected to tucker 450. The servo drive 5 is connected to a mounting bracket 816 for mounting the servo drive 5 on the base/frame of the ice cream sandwich apparatus.

Figure 25:
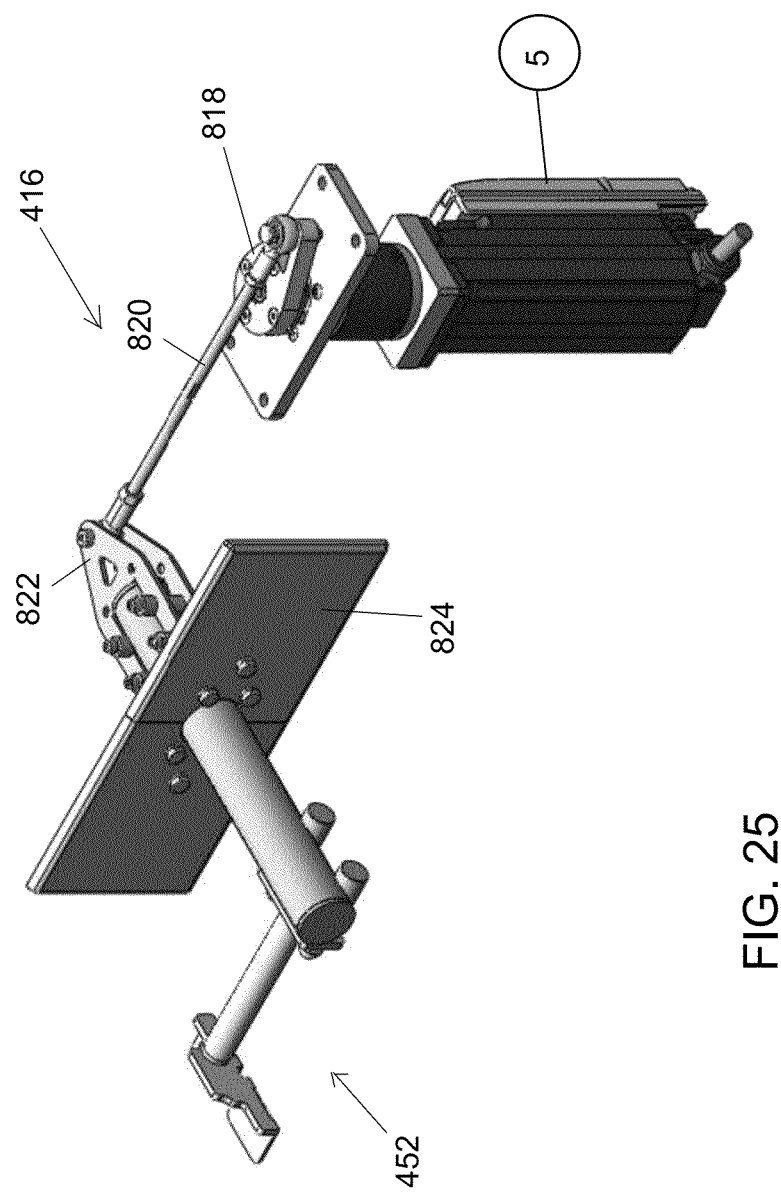
FIG. 25 is a perspective view of the servo motor drive for the pusher of the third station.

The third station 416 further comprises the pusher 452 driven by the servo drive 4, as shown in FIGS. 19 and 25.

The servo drive 4 is fitted with a lever 818 driving a push rod 820, which in turn is connected to lever 822 of a reciprocating shuttle 824. The reciprocating shuttle 824 is connected to the pusher 452. The servo drive 4 is connected to a mounting bracket 826 for mounting the servo drive 4 on the base/frame of the ice cream sandwich apparatus.

Figure 26:
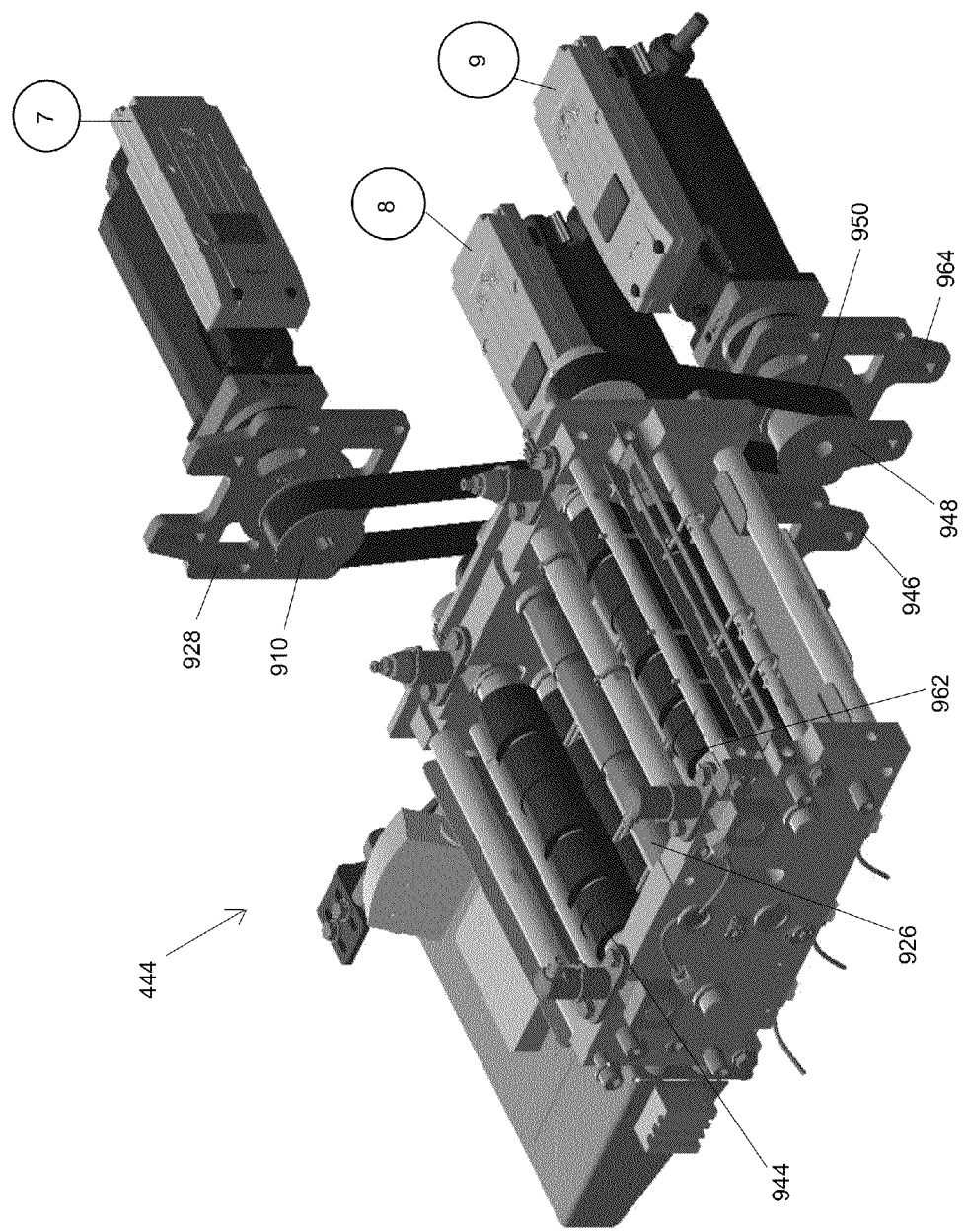
FIG. 26 is a perspective view of the servo motor drive for the sheet feeder of the fourth station.
Figure 27:
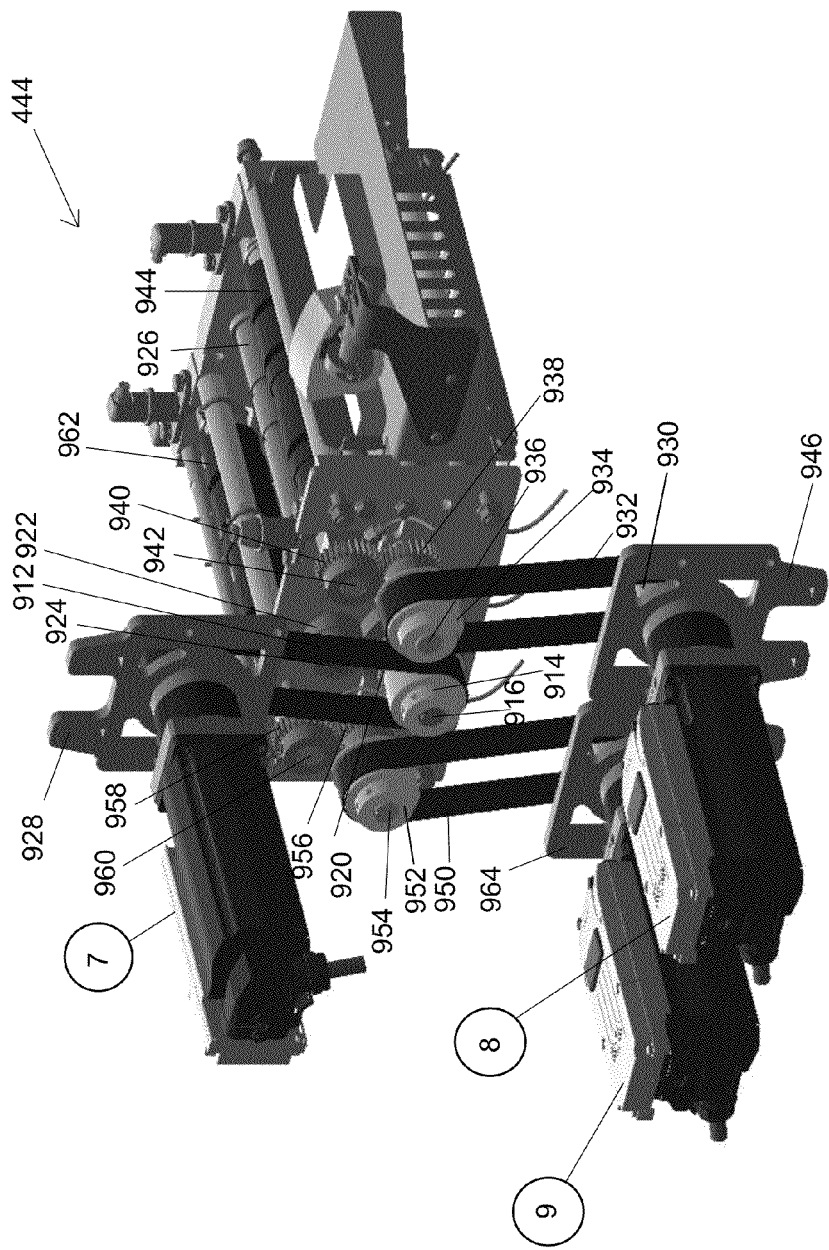
FIG. 27 is an opposite side perspective view of the servo motor drive for the sheet feeder of the fourth station.

The fourth station 418 comprises the sheet feeder 444 driven by the servo drives 7, 8, and 9, as shown in FIGS. 19, 25 and 26.

The servo motor 7 is fitted with a pulley 910 driving a drive belt 912, and in turn driving a pulley 914 on a drive shaft 916 of a sheet driving roller 918. The drive shaft 916 is fitted with a gear 920 driving a gear 922 fitted on a sheet drive shaft 924 of a sheet driving roller 926. The servo drive 7 is connected to a mounting bracket 928 for mounting the servo drive 7 on the base/frame of the ice cream sandwich apparatus.

The servo motor 8 is fitted with a pulley 930 driving a drive belt 932, which in turn drives a pulley 934 on a drive shaft 936 of a sheet driving roller 938. The drive shaft 936 is fitted with a gear 938 driving a gear 940 fitted on a drive shaft 942 of a sheet driving roller 944. The servo drive 8 is connected to a mounting bracket 946 for mounting the servo drive 8 on the base/frame of the ice cream sandwich apparatus.

The servo motor 9 is fitted with a pulley 948 driving a drive belt 950, which in turn drives a pulley 952 on a drive shaft 954 of a sheet driving roller 956. The drive shaft 954 is fitted with a gear 956 driving a gear 958 fitted on a drive shaft 960 of a sheet driving roller 962. The servo drive 9 is connected to a mounting bracket 964 for mounting the servo drive 9 on the base/frame of the ice cream sandwich apparatus.

Figure 28:
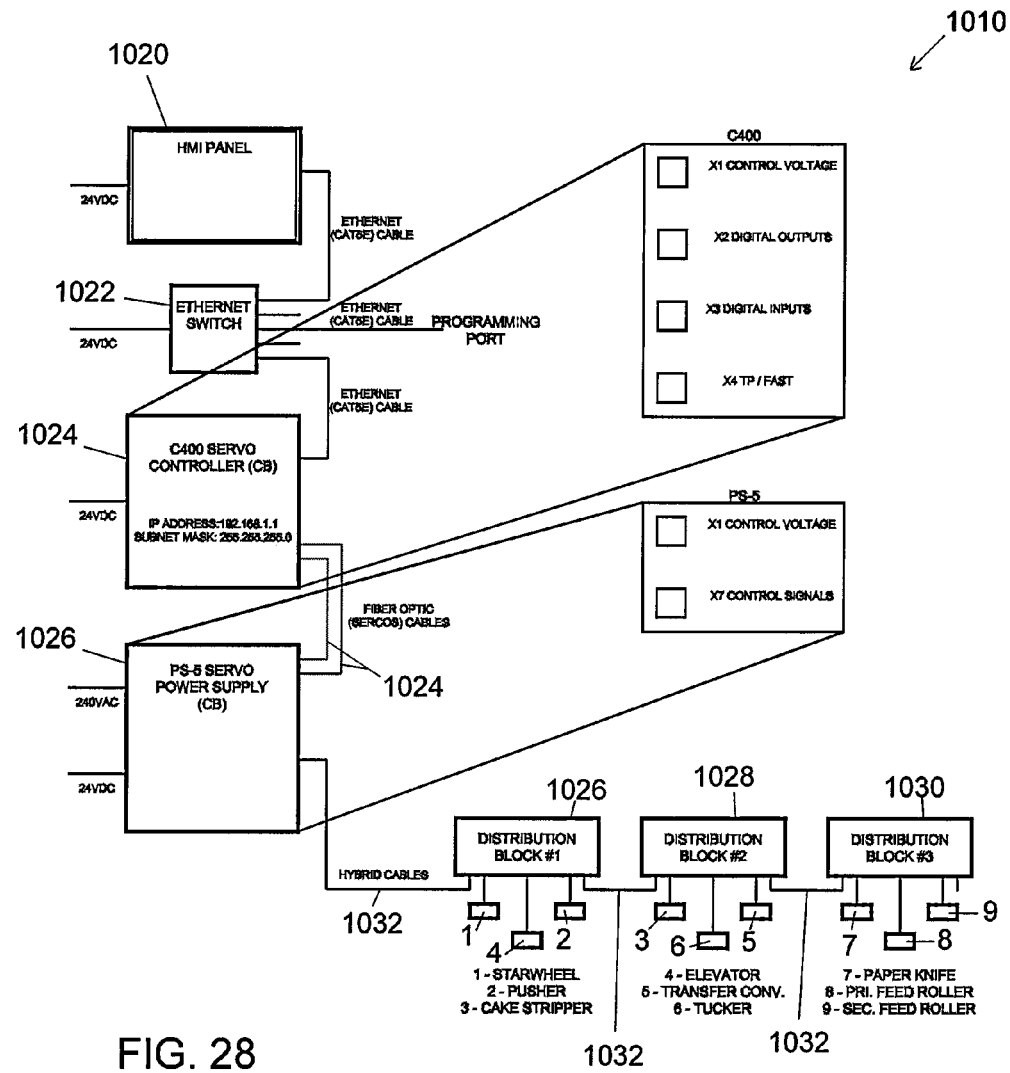
FIG. 28 is a schematic view of the network communication system for the ice cream sandwich apparatus.

The network communication system 1010 is shown in FIG. 28.

The network communication system 1010 comprises a Human Machine Interface (HMI) panel 1012, Ethernet switch 1014, servo controller 1016, and servo power supply 1018 connected to a power source (e.g. 24 VDC, not shown). The HMI panel 1012 and Ethernet switch 1014 are connected by Ethernet cable 1020. The Ethernet switch 1014 and servo controller 1016 are connected by Ethernet cable 1022. The servo controller 1016 and power supply 1026 are connected by fiber optic cables, 1024, 1024.

The servo power supply 1026 is connected to distribution blocks 126, 128, 130 by hybrid cables 1032. The distribution block 1026 is connected to the star wheel servo drive 1, pusher servo drive 4, and stripper servo drive 2 (See FIGS. 19 and 28). The distribution block 1028 is connected to the elevator servo drive 3, conveyor servo drive 6, and tucker servo drive 5. The distribution block 1030 is connected to knife servo motor 7, primary roller servo motor 8, and secondary roller servo motor 9.

DRAWINGS

408 - base/frame
410 - ice cream sandwich apparatus
412 - first station
414 - second station
416 - third station
418 - fourth station
420 - star wheel
422 - fingers
424 - pocket
426 - nozzle
428 - chute
430 - stripper plate
432 - conveyor
434 - tri-fingers
436 - wrapper head
438 - elevator
440 - elevator pad
442 - primary roller
444 - sheet feeder
446 - secondary roller
448 - rotary knife
450 - tucker
452 - pusher 454 - hold-down plate
456 - heated plate
458 - reeler
460 - real of wrapper paper
462 - electronic controller
464 - display
466 - back panel cover
510 - pulley
512 - drive belt
514 - pulley
516 - drive shaft
518 - mounting bracket
520 - bearing
522 - lever
524 - drive shaft
526 - shaft
528 - shuttle
610 - pulley
612 - drive belt
614 - pulley
616 - drive shaft
618 - mounting bracket
710 - lever
712 - pushrod
714 - shuttle
716 - guide rail
718 - lever
720 - horizontal shaft
722 - vertical shaft
724 - mounting bracket
810 - pulley
812 - drive belt
814 - pulley
816 - mounting bracket
818 - lever
820 - push rod
822 - lever
824 - shuttle
826 - mounting bracket
910 - pulley
912 - drive belt
914 - pulley
916 - drive shaft
918 - sheet driving roller
920 - gear
922 - gear
924 - drive shaft
926 - sheet driving roller
928 - mounting bracket
930 - pulley
932 - drive belt
934 - pulley
936 - drive shaft
938 - gear
940 - gear
942 - drive shaft
944 - sheet driving roller
946 - mounting bracket
948 - pulley
950 - drive belt
952 - pulley
954 - drive shaft
956 - gear
958 - gear
960 - drive shaft
962 - sheet driving roller
964 - mounting bracket 1010 - network communication system
1012 - Human Machine Interface (HMI) panel
1014 - Ethernet switch
1016 - servo controller
1018 - servo power supply
1020 - Ethernet cable
1022 - Ethernet cable
1024 - fiber optic cable
1026 - distribution box
1028 - distribution box
1030 - distribution box
1032 - hybrid cable

We claim:

1. An ice cream sandwich making apparatus, comprising:
a first station for making ice cream sandwiches, the first station comprising at least one ice cream extruder and a star wheel configured for receiving wafers and extruding ice cream between the wafers to make the ice cream sandwiches;
a first servo motor driving the star wheel of the first station;
a second station for transporting the ice cream sandwiches from the first station, the second station comprising a conveyor;
a second servo motor driving the conveyor of the second station; and
a third station for receiving the ice cream sandwiches from the conveyor, the third station comprising a wrapper head configured to wrap the ice cream sandwiches, the wrapper head comprising an elevator configured for lifting an ice cream sandwich and a wrapper sheet up through the wrapper head, guides for folding the wrapper sheet around the ice cream sandwich, tuckers configured to close beneath the ice cream sandwich and fold in the wrapper sheet around ends of the ice cream sandwich, and a pusher configured to extend and fold flaps of the wrapper sheet around the ice cream sandwich;
a third servo motor driving the wrapper head of the third station; and
a controller connected to the servo motors to control operation of the servo motors and control timing between the stations according to a preselected program.

2. The apparatus according to claim 1, further comprising a fourth station for sheet feeding sheet wrappers to the third station.

3. The apparatus according to claim 1, wherein the conveyor comprises tri-fingers for transferring the ice cream sandwiches from the conveyor to an elevator of the wrapper head.

4. The apparatus according to claim 2, wherein the conveyor comprises tri-fingers for transferring the ice cream sandwiches from the conveyor to an elevator of the wrapper head.

5. The apparatus according to claim 1, further comprising a hold-down plate located relative to the wrapper head, and configured to maintain a pressure on the ice cream sandwich as final wraps of the wrapper sheet are made, wherein the hold-down plate is heated and seals the folded flaps as the ice cream sandwich is pushed across the heated hold-down plate.

6. The apparatus according to claim 1, wherein the controller is configured to operate at least one of the servo motors in a manner to differentially change the speed of rotation during at least one cycle of rotation of the servo motor.

7. The apparatus according to claim 1, wherein the controller is configured to operate at least one of the servo motors to accelerate during at least a portion of the at least one cycle of rotation.

8. The apparatus according to claim 1, wherein the controller is configured to operate the at least one of the servo motors to decelerate during at least a portion of the at least one cycle of rotation.

9. The apparatus according to claim 1, wherein the controller is configured to operate at least one of the servo motors to accelerate and then decelerate, or decelerate and then accelerate, during at least a portion of the at least one cycle of rotation.

10. The apparatus according to claim 1, wherein the controller is configured to operated at least one of the servo motors to stop and then start, or start and then stop, during at least a portion of the at least one cycle of rotation.

11. The apparatus according to claim 1, wherein the controller is configured to operate at least one of the servo motors differentially to undergo a complex phase of motion during one or more cycles of rotation of the at least one servo motor.

12. The apparatus according to claim 1, wherein the controller is configured to operate at least one of the stations at a rate different from at least one other station.

13. The apparatus according to claim 1, wherein the controller is configured to operate all of the stations at a same rate.

14. The apparatus according to claim 1, wherein one or more of the stations comprise multiple servo motors.

15. The apparatus according to claim 14, wherein the controller is configured to control the operation of the multiple servo motors of a particular station, and control timing between the multiple servo motors according to a preselected program.

16. The apparatus according to claim 1, wherein the controller is configured to control timing of motions on axes of the ice cream sandwich apparatus for production of different size ice cream sandwiches.

17. An ice cream sandwich making apparatus, comprising:
a first station for making ice cream sandwiches, the first station comprising at least one ice cream extruder and a star wheel configured for receiving wafers and extruding ice cream between the wafers to make the ice cream sandwiches;
a first servo motor driving the star wheel of the first station;
a second station for transporting the ice cream sandwiches from the first station, the second station comprising a conveyor;
a second servo motor driving the conveyor of the second station; and
a third station for receiving the ice cream sandwiches from the conveyor, the third station comprising a wrapper head configured to wrap the ice cream sandwiches, the wrapper head comprising an elevator configured for lifting an ice cream sandwich and a wrapper sheet up through the wrapper head, guides for folding the wrapper sheet around the ice cream sandwich, tuckers configured to close beneath the ice cream sandwich and fold in the wrapper sheet around ends of the ice cream sandwich, and a pusher configured to extend and fold flaps of the wrapper sheet around the ice cream sandwich;
a third servo motor driving the wrapper head of the third station; and
a controller connected to the servo motors to control operation of the servo motors, control timing between the servo motors, and control timing between the stations according to a preselected program.

18. An ice cream sandwich making apparatus, comprising:
a first station for making ice cream sandwiches, the first station comprising at least one ice cream extruder and a star wheel configured for receiving wafers and extruding ice cream between the wafers to make the ice cream sandwiches, the first station comprising a star wheel servo motor and a stripper servo motor;
a second station for transporting the ice cream sandwiches from the first station, the second station comprising a conveyor driven by a conveyor servo motor; and
a third station for receiving the ice cream sandwiches from the conveyor, the third station comprising a wrapper head configured to wrap the ice cream sandwiches, the third station further comprising an elevator servo motor, pusher servo motor, and a tucker servo motor, the wrapper head comprising an elevator configured for lifting an ice cream sandwich and a wrapper sheet up through the wrapper head, guides for folding the wrapper sheet around the ice cream sandwich, tuckers configured to close beneath the ice cream sandwich and fold in the wrapper sheet around ends of the ice cream sandwich, and a pusher configured to extend and fold flaps of the wrapper sheet around the ice cream sandwich;
a fourth station for sheet feeding, the fourth station comprises a knife servo motor, a primary roller servo motor, and a secondary roller servo motor; and
a controller connected to the servo motors to control operation of the servo motors, control timing between the servo motors, and control timing between the stations according to a preselected program.

* * * * *